United States Patent
Naganokawa et al.

(10) Patent No.: US 12,452,561 B2
(45) Date of Patent: Oct. 21, 2025

(54) IMAGE CAPTURING APPARATUS AND ELECTRONIC DEVICE

(71) Applicant: Sony Semiconductor Solutions Corporation, Kanagawa (JP)

(72) Inventors: Haruhisa Naganokawa, Kanagawa (JP); Kengo Umeda, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 155 days.

(21) Appl. No.: 18/554,342

(22) PCT Filed: Mar. 29, 2022

(86) PCT No.: PCT/JP2022/015491
§ 371 (c)(1),
(2) Date: Oct. 6, 2023

(87) PCT Pub. No.: WO2022/249736
PCT Pub. Date: Dec. 1, 2022

(65) Prior Publication Data
US 2024/0121531 A1   Apr. 11, 2024

(30) Foreign Application Priority Data
May 25, 2021   (JP) .................. 2021-087990

(51) Int. Cl.
H04N 25/778   (2023.01)
H04N 25/772   (2023.01)
H04N 25/78    (2023.01)

(52) U.S. Cl.
CPC ......... H04N 25/778 (2023.01); H04N 25/772 (2023.01); H04N 25/78 (2023.01)

(58) Field of Classification Search
None
See application file for complete search history.

(56) References Cited

U.S. PATENT DOCUMENTS

2019/0149754 A1   5/2019   Otaka
2019/0305020 A1   10/2019  Liu
(Continued)

FOREIGN PATENT DOCUMENTS

JP   2018148528 A   9/2018
JP   2020096225 A   6/2020
(Continued)

OTHER PUBLICATIONS

International Search Report (PCT/ISA/210), International Application No. PCT/JP2022/015491, dated Jun. 21, 2022.

*Primary Examiner* — Mark T Monk
(74) *Attorney, Agent, or Firm* — Michael Best & Friedrich LLP

(57) ABSTRACT

Image capturing that suppresses a drop in numerical aperture and achieves a smaller size is disclosed. In one example, an image capturing apparatus includes pixels each having a photoelectric conversion unit, a floating diffusion that outputs a voltage according to a charge obtained from photoelectric conversion by the photoelectric conversion unit, and a current amplification unit that amplifies a current according to the voltage of the floating diffusion. The region in which the photoelectric conversion units are disposed and the region in which the current amplification units are disposed transmit and receive the voltages of the floating diffusions through a corresponding signal transmission unit.

24 Claims, 36 Drawing Sheets

(56) References Cited

U.S. PATENT DOCUMENTS

2020/0007798 A1 1/2020 Liu
2021/0314516 A1 10/2021 Yonemoto

FOREIGN PATENT DOCUMENTS

| TW | 202015395 A | 4/2020 |
| TW | 202038461 A | 10/2020 |
| WO | 2020045122 A1 | 3/2020 |

IMAGE CAPTURING APPARATUS AND ELECTRONIC DEVICE

TECHNICAL FIELD

The present disclosure relates to an image capturing apparatus and an electronic device.

BACKGROUND ART

Conventional image sensors generally use a rolling shutter method in which a captured image signal photoelectrically converted in the photoelectric conversion unit of each pixel is analog-to-digital converted ("AD-converted", hereinafter) on a column-by-column basis, but there is a problem in that image distortion occurs due to a shift in the readout time for each column. Accordingly, a global shutter-type image sensor has been proposed in which an AD conversion unit is provided for each pixel and all pixels perform AD conversion simultaneously (see PTL 1).

CITATION LIST

Patent Literature

[PTL 1]
JP 2018-148528A

SUMMARY

Technical Problem

However, global shutter-type image sensors provide an AD conversion unit for each pixel, which increases the size of the pixel and therefore makes it difficult to reduce the size of the pixel. An image capturing apparatus that performs area AD conversion, in which a plurality of pixels share an AD conversion unit, has therefore been proposed.

Recently, as described in PTL 1, a technique has been put into practical use in which the photoelectric conversion unit and AD conversion unit are provided on separate substrates or in separate layers, and signals are transmitted between the substrates or a plurality of layers through of vias, Cu—Cu connections, or the like. However, as the number of signals transmitted and received between a plurality of substrates or layers increases, the number of wires on each substrate or layer increases, which reduces the surface area allocated to the photoelectric conversion units, the AD conversion units, and the like. If the surface area allocated to the photoelectric conversion units, the AD conversion units, and the like is reduced, the numerical aperture at the photoelectric conversion units is reduced as well, making it difficult to reduce the size of the photoelectric conversion units, the AD conversion unit, and the like and leading to problems such as the inability to increase the pixel count.

When disposing an image capturing apparatus that performs area AD conversion over a plurality of substrates or a plurality of layers, it is necessary to avoid the problems described above.

Accordingly, the present disclosure provides an image capturing apparatus and an electronic device capable of suppressing a drop in numerical aperture and achieving a smaller size.

Solution to Problem

To solve the above-described problem, an image capturing apparatus according to the present disclosure includes:

a plurality of pixels each having a photoelectric conversion unit;

a floating diffusion that outputs a voltage according to a charge obtained from photoelectric conversion by the photoelectric conversion unit in the pixel;

a current amplification unit that amplifies a current according to the voltage of the floating diffusion;

a storage unit that stores a signal according to the current amplified by the current amplification unit;

an analog-digital converter, provided for each of area pixels constituted by two or more of the pixels among the plurality of pixels, that converts the signals stored in two or more of the storage units corresponding to the two or more pixels in the area pixel into digital signals;

a plurality of regions which are layered and in which a plurality of the photoelectric conversion units in the plurality of pixels, a plurality of the analog-digital converters, a plurality of the floating diffusions, a plurality of the current amplification units, and a plurality of the storage units are disposed; and a signal transmission unit that transmits and receives signals between the plurality of regions, wherein of the plurality of regions, a region in which the plurality of photoelectric conversion units are disposed is provided separate from a region in which the plurality of current amplification units are disposed, and the region in which the plurality of photoelectric conversion units are disposed in the area pixel and the region in which the plurality of current amplification units are disposed in the area pixel transmit and receive the voltages of the plurality of floating diffusions through corresponding ones of the signal transmission units.

The plurality of current amplification units, the plurality of storage units, and the plurality of analog-digital converters may be disposed in a same region among the plurality of regions.

The plurality of current amplification units, the plurality of storage units, and the plurality of analog-digital converters may be disposed in a same layer in the same region.

Two or more of the current amplification units and two or more of the storage units belonging to a same area pixel may be disposed symmetrically along respective opposing sides of a corresponding one of the analog-digital converters.

The plurality of current amplification units, the plurality of analog-digital converters, and the plurality of storage units may be disposed in mutually different layers in the same region.

The plurality of storage units may be disposed in a wiring layer in the same region.

The image capturing apparatus may include: a first region in which the plurality of photoelectric conversion units are disposed; and a second region in which the plurality of current amplification units, the plurality of storage units, and the plurality of analog-digital converters are disposed, and the first region and the second region may transmit and receive the voltages of the plurality of floating diffusions through mutually different ones of the signal transmission units, for each of the pixels.

The image capturing apparatus may include: a first substrate having the first region; and a second substrate having the second region, and the first substrate and the second substrate may transmit and receive the voltages of the floating diffusions through mutually different ones of the signal transmission units, for each of the pixels.

(9) The image capturing apparatus according to (1), wherein the plurality of photoelectric conversion units, the plurality of current amplification units and the plurality of storage units, and the plurality of analog-digital converters are disposed in mutually different ones of the plurality of regions.

In the image capturing apparatus, the plurality of regions may include:
- a first region in which the plurality of photoelectric conversion units are disposed;
- a second region in which the plurality of current amplification units and the plurality of storage units are disposed; and
- a third region in which the plurality of analog-digital converters are disposed, and the first region and the second region may transmit and receive the voltages of the plurality of floating diffusions through mutually different ones of the signal transmission units, for each of the pixels.

(11) The image capturing apparatus according to (10), wherein the plurality of current amplification units and the plurality of storage units are disposed in a same layer in the second region.

The image capturing apparatus may include: a first substrate on which the first region and the second region are layered; and
  a second substrate having the third region,
  and the first substrate and the second substrate may transmit and receive the signals stored in the storage units through mutually different ones of the signal transmission units, for each of the pixels.

The plurality of photoelectric conversion units, the plurality of current amplification units, the plurality of storage units, and the plurality of analog-digital converters may be disposed in mutually different ones of the plurality of regions.

In the image capturing apparatus, the plurality of regions may include:
- a first region in which the plurality of photoelectric conversion units are disposed;
- a second region in which the plurality of current amplification units are disposed;
- a third region in which the plurality of storage units are disposed; and
- a fourth region in which the plurality of analog-digital converters are disposed, and the first region and the second region may transmit and receive the voltages of the plurality of floating diffusions through mutually different ones of the signal transmission units, for each of the pixels.

The image capturing apparatus may include a first substrate on which the first region, the second region, and the third region are layered; and
  a second substrate having the fourth region,
  and the first substrate and the second substrate may transmit and receive the signals stored in the plurality of storage units through mutually different ones of the signal transmission units, for each of the pixels.

The image capturing apparatus may include: a first substrate on which the first region and the second region are layered; and
  a second substrate having the third region and the fourth region,
  and the first substrate and the second substrate may transmit and receive the current amplified by the plurality of current amplification unit through mutually different ones of the signal transmission units, for each of the pixels.

The plurality of photoelectric conversion units, the plurality of current amplification units, and the plurality of storage units and the plurality of analog-digital converters may be disposed in mutually different ones of the plurality of regions.

In the image capturing apparatus, the plurality of regions may include:
- a first region in which the plurality of photoelectric conversion units are disposed;
- a second region in which the plurality of current amplification units are disposed; and
- a third region in which the plurality of storage units and the plurality of analog-digital converters are disposed,
  and the first region and the second region may transmit and receive the voltages of the plurality of floating diffusions through mutually different ones of the signal transmission units, for each of the pixels.

The image capturing apparatus may include: a first substrate on which the first region and the second region are layered; and
  a second substrate having the third region,
  and the first substrate and the second substrate may transmit and receive the current amplified by the plurality of current amplifications through mutually different ones of the signal transmission units, for each of the pixels.

The plurality of photoelectric conversion units, the plurality of current amplification units and the plurality of analog-digital converters, and the plurality of storage units may be disposed in mutually different ones of the plurality of regions.

The first region, the second region, and the third region may be layered on a same substrate.

The photoelectric conversion units may have a semiconductor layer formed from silicon or a semiconductor layer formed from a material other than silicon.

The signal transmission unit may transmit and receive the signals through a via, a bump, or a Cu—Cu connection.

According to the present disclosure, an electronic device is provided, the electronic device including:
- an image capturing apparatus that outputs a digital signal, obtained through photoelectric conversion, for each of pixels; and
- a signal processing unit that performs signal processing on the digital signal, wherein the image capturing apparatus includes:
- a plurality of pixels each having a photoelectric conversion unit;
- a floating diffusion that outputs a voltage according to a charge obtained from photoelectric conversion by the photoelectric conversion unit in the pixel;
- a current amplification unit that amplifies a current according to the voltage of the floating diffusion;
- a storage unit that stores a signal according to the current amplified by the current amplification unit;
- an analog-digital converter, provided for each of area pixels constituted by two or more of the pixels among the plurality of pixels, that converts the signals stored in two or more of the storage units corresponding to the two or more pixels in the area pixel into digital signals;
- a plurality of regions which are layered and in which a plurality of the photoelectric conversion units in the plurality of pixels, a plurality of the analog-digital converters, a plurality of the floating diffusions, a plurality of the current amplification units, and a plurality of the storage units are disposed; and
a signal transmission unit that transmits and receives signals between the plurality of regions,
wherein of the plurality of regions, a region in which the plurality of photoelectric conversion units are disposed is provided separate from a region in which the plurality of current amplification units are disposed, and
the region in which the plurality of photoelectric conversion units are disposed in the area pixel and the region in which the plurality of current amplification units are disposed in the area pixel transmit and receive the voltages of the plurality of floating diffusions through corresponding ones of the signal transmission units.

DESCRIPTION OF EMBODIMENTS

Embodiments of an image capturing apparatus and an electronic device will be described hereinafter with reference to the drawings. Although the following descriptions will focus on the main components of the image capturing apparatus and the electronic device, the image capturing apparatus and the electronic device may include components and functions that are not illustrated or described. The following descriptions do not exclude components or functions that are not illustrated or described.

[Configuration of Image Capturing Apparatus]

Figure 1:
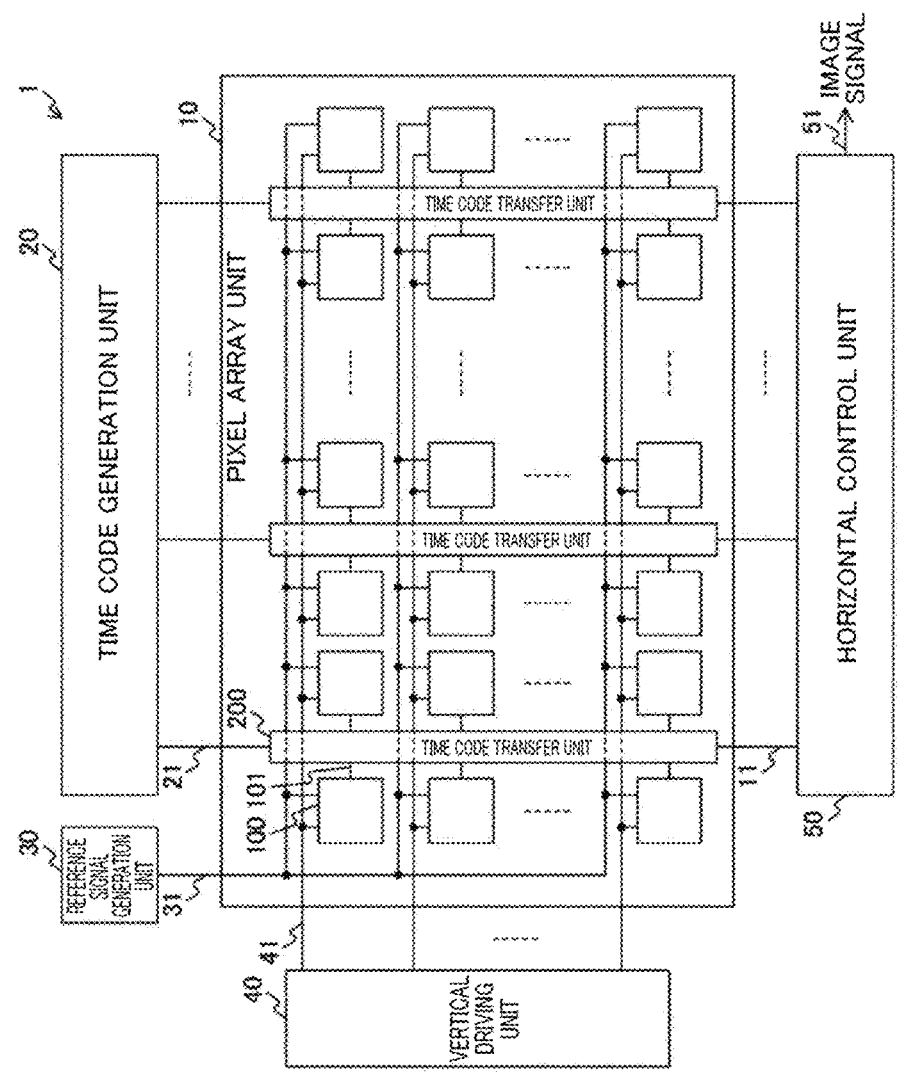
FIG. 1 is a diagram illustrating an example of the configuration of an image capturing apparatus according to an embodiment of the present technique.

FIG. 1 is a diagram illustrating an example of the configuration of an image capturing apparatus 1 according to an embodiment of the present technique. The image capturing apparatus 1 includes a pixel array unit 10, a time code generation unit 20, a reference signal generation unit 30, a vertical driving unit 40, and a horizontal control unit 50.

The pixel array unit 10 includes a plurality of area pixels 100, and pixel signals are analog-to-digital converted ("AD-converted", hereinafter) for each area pixel 100. Each area pixel 100 includes a plurality of pixels. Each pixel has a photoelectric conversion unit. As will be described below, each area pixel 100 has one analog-to-digital conversion unit ("AD conversion unit", hereinafter). The AD conversion unit sequentially AD-converts the analog pixel signals captured by each pixel in the area pixel 100 and outputs a corresponding digital signal. The area pixel 100 can be called a pixel, and each photoelectric conversion unit within a pixel can be called a sub-pixel or a color pixel.

The pixel array unit 10 includes a plurality of the area pixels 100, which generate pixel signals, arranged in a two-dimensional matrix, and a plurality of time code transfer units 200 arranged between the plurality of area pixels 100 parallel to the column direction thereof. Each area pixel 100 outputs a time code, which is a result of AD-converting the analog pixel signal from each pixel. Each time code transfer unit 200 transfers these time codes sequentially in the column direction. The transferred time codes are input to the horizontal control unit 50. A signal line 101 is a signal line connecting the area pixel 100 and the time code transfer unit 200. The configurations of the area pixel 100 and the time code transfer unit 200 will be described in detail later.

The time code generation unit 20 generates time codes and outputs the time codes to the time code transfer unit 200. Here, the "time code" is a code indicating the time elapsed since the start of the AD conversion in the area pixel 100. This time code is of a size equal to the number of bits in the post-conversion digital pixel signal, and a Gray code can be used, for example. The time codes are output to the time code transfer units 200 over signal lines 21.

The reference signal generation unit 30 generates a reference signal and outputs the reference signal to the area pixel 100. This reference signal is a signal serving as a reference for the AD conversion in the area pixel 100, and a signal in which the voltage decreases linearly with time (a ramp signal) can be used, for example. This reference signal is output over a signal line 31. The generation and output of time codes by the time code generation unit 20 is performed in synchronization with the generation and output of reference signals by the reference signal generation unit 30. As a result, the time code and the reference signal output from the time code generation unit 20 and the reference signal generation unit 30, respectively, correspond one-to-one, and the voltage of the reference signal can be obtained from the time code. A time code decoding unit 52, which will be described later, performs decoding by obtaining the voltage of the reference signal from the time code.

The vertical driving unit 40 generates and outputs control signals and the like for the area pixel 100. These control signals are output to the area pixels 100 over signal lines 41. The configuration of the vertical driving unit 40 will be described in detail later.

The horizontal control unit 50 processes the time codes transferred by the time code transfer units 200. The time codes are input to the horizontal control unit 50 over signal lines 11. The configuration of the horizontal control unit 50 will be described in detail later.

[Configuration of Vertical Control Unit]

Figure 2:
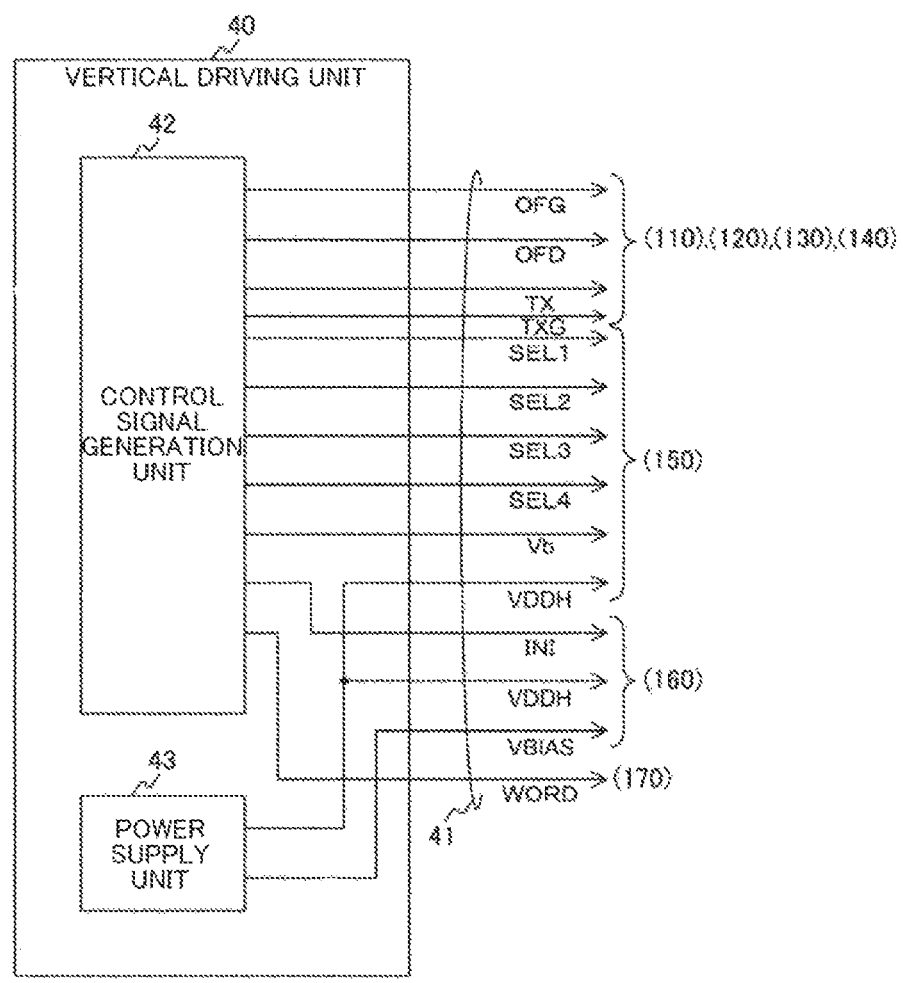
FIG. 2 is a diagram illustrating an example of the configuration of a vertical driving unit according to the embodiment of the present technique.

FIG. 2 is a diagram illustrating an example of the configuration of the vertical driving unit 40 according to the embodiment of the present technique. The vertical driving unit 40 includes a control signal generation unit 42 and a power supply unit 43.

The control signal generation unit 42 generates and outputs control signals for the area pixels 100. The power supply unit 43 supplies power necessary for the operations of the area pixels 100. The control signals and power supply are carried by the signal lines 41. As illustrated in the drawing, each signal line 41 is constituted by a plurality of signal lines (OFG, OFD, TX, SEL1, SEL2, SEL3, SEL4, Vb, INI, and WORD) and a plurality of power lines (VDDH and VBIAS). The signal lines (OFG, OFD, TX, SEL1, SEL2, SEL3, SEL4, Vb, INI, and WORD) are connected to the control signal generation unit 42, and carry the control signals for the area pixels 100. On the other hand, the power lines (VDDH and VBIAS) are connected to the power supply unit 43, and are used to supply power. These signal lines will be described in detail later.

[Configuration of Horizontal Control Unit]

Figure 3:
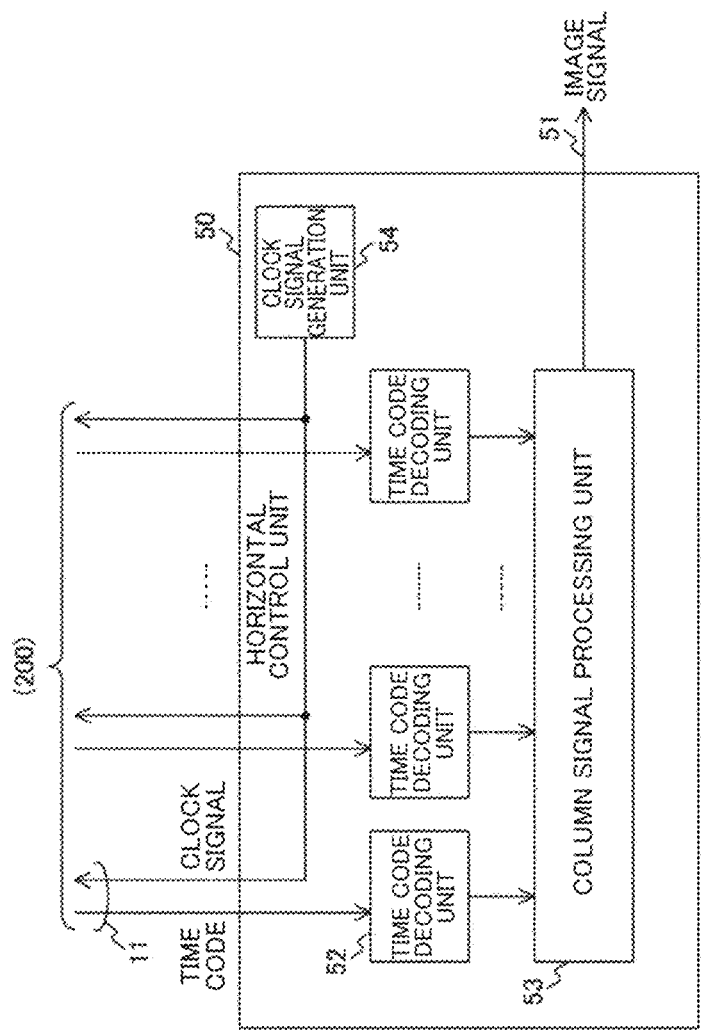
FIG. 3 is a diagram illustrating an example of the configuration of a horizontal control unit according to the embodiment of the present technique.

FIG. 3 is a diagram illustrating an example of the configuration of the horizontal control unit 50 according to the embodiment of the present technique. The horizontal control unit 50 includes time code decoding units 52, a column signal processing unit 53, and a clock signal generation unit 54.

The time code decoding units 52 decode time codes. As a result of this decoding, a digital pixel signal that is the result of AD conversion is generated. A plurality of the time code decoding units 52 are provided in the horizontal control unit 50 and correspond one-to-one with the time code transfer units 200 provided in the pixel array unit 10. The time codes from the corresponding time code transfer units 200 are input to the time code decoding units 52 simultaneously. The decoding of the input time codes is performed simultaneously and in parallel by the time code decoding units 52. The decoded plurality of digital pixel signals are then input to the column signal processing unit 53.

The column signal processing unit 53 processes the digital pixel signals output by the time code decoding units 52. Correlated double sampling (CDS), which will be described later, can be used for this processing. The column signal processing unit 53 also performs horizontal transfer on the processed digital pixel signals. This sequentially transfers and outputs the processed pixel signals corresponding to the plurality of digital pixel signals simultaneously input by the plurality of time code decoding units 52. The pixel signals output from the column signal processing unit 53 are output signals of the image capturing apparatus 1, and correspond to digital pixel signals.

[Configuration of Pixel]

Figure 4:
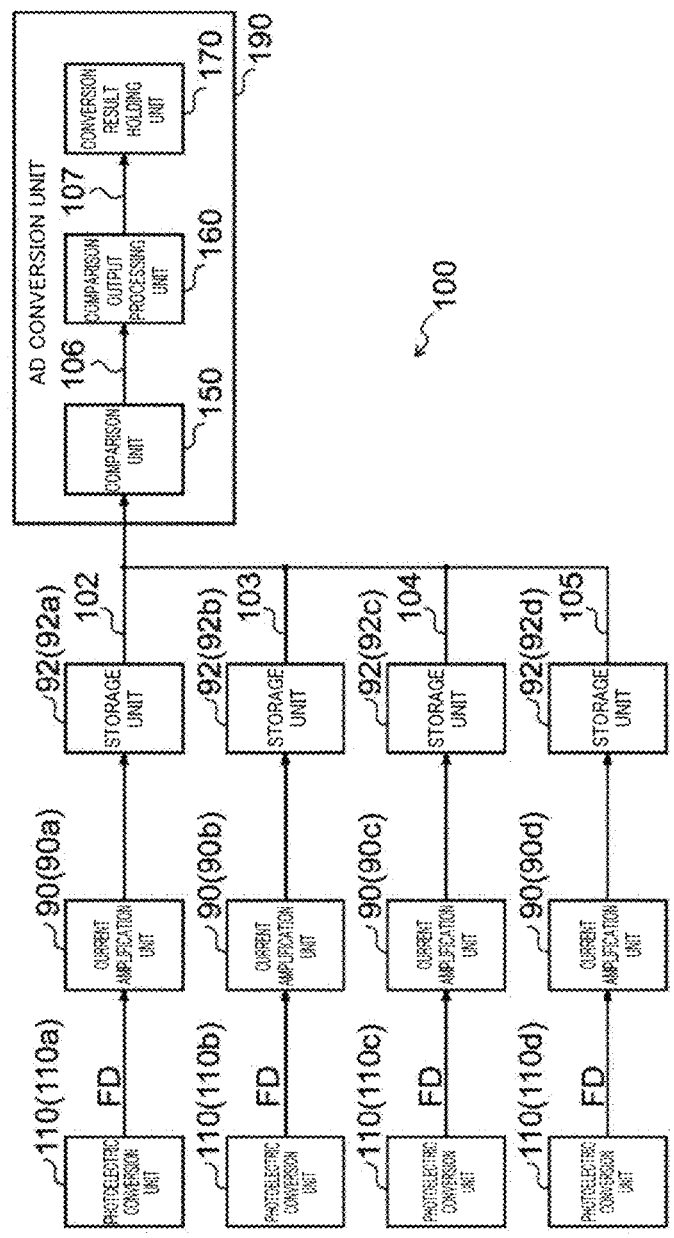
FIG. 4 is a diagram illustrating an example of the configuration of an area pixel according to the embodiment of the present technique.
Figure 11:
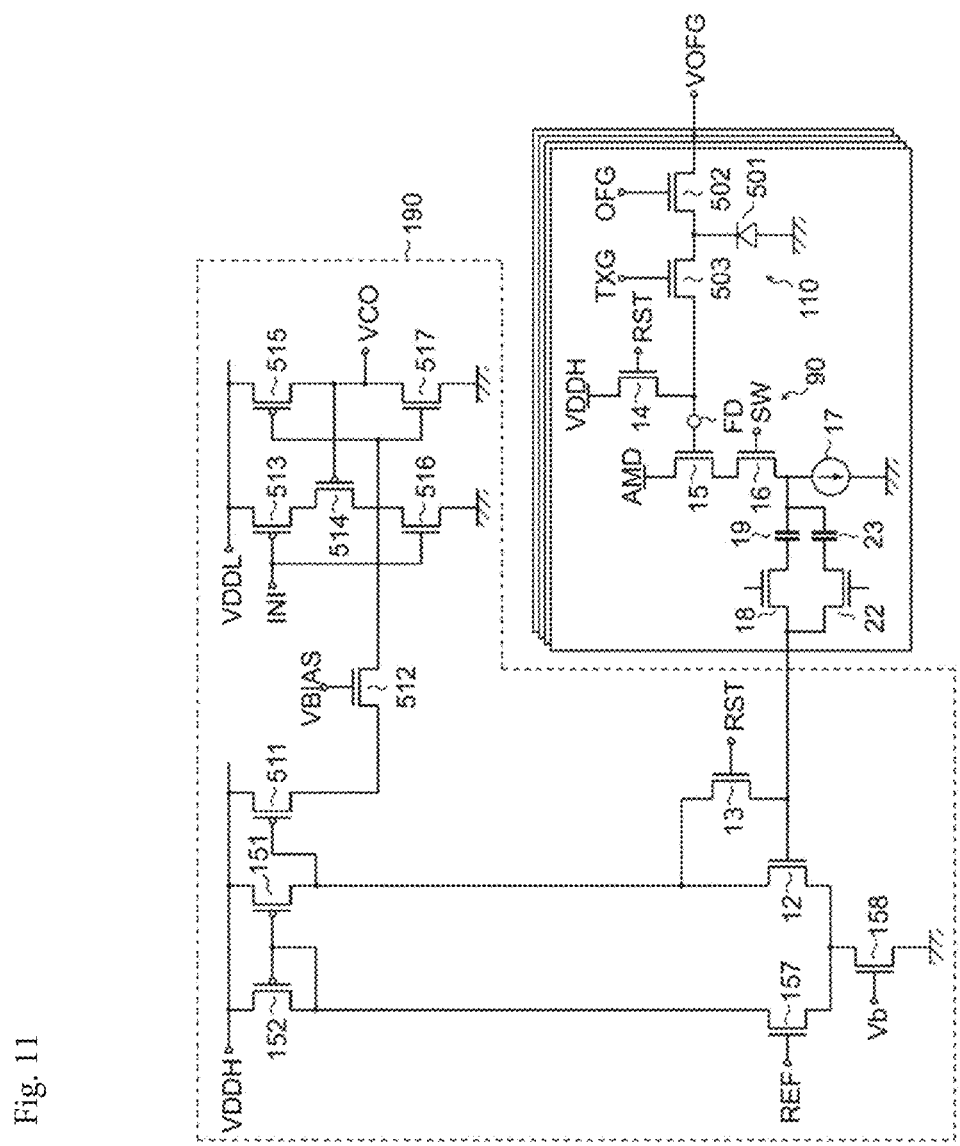
FIG. 11 is a circuit diagram of an area pixel according to a first example.

FIG. 4 is a diagram illustrating an example of the configuration of the area pixel 100 according to the embodiment of the present technique. Each area pixel 100 includes four photoelectric conversion units 110 (110a, 110b, 110c, and 110d), four current amplification units 90 (90a, 90b, 90c, and 90d), four storage units 92 (92a, 92b, 92c, and 92d), and an AD conversion unit (AD conversion unit) 190, corresponding to four pixels. As illustrated in FIG. 11 and the like and described later, each storage unit 92 has a storage unit 19 that stores a P-phase signal and a storage unit 23 that stores a D-phase signal.

Each photoelectric conversion unit 110 performs photoelectric conversion for each pixel to generate and hold an analog pixel signal corresponding to incident light. The photoelectric conversion units 110 are controlled by the vertical driving unit 40, and input the held analog pixel signals to the corresponding current amplification units 90. Each current amplification unit 90 amplifies the analog pixel signal and stores a charge corresponding to the amplified voltage in the corresponding storage unit 92. The voltages corresponding to the charges stored in storage units 92 are supplied to a comparison unit 150 of the AD conversion unit 190 over a signal line 102. The configuration of the photoelectric conversion unit 110 will be described in detail later. The comparison unit 150 has one input node, and the voltages corresponding to the charges stored in the four storage units 92 corresponding to the four pixels are sequentially input to the comparison unit 150.

The AD conversion unit 190 AD-converts the analog pixel signals generated by the photoelectric conversion units 110. The AD conversion unit 190 includes the comparison unit 150, a comparison output processing unit 160, and a conversion result holding unit 170.

The comparison unit 150 compares the reference signal generated by the reference signal generation unit 30 with the analog pixel signals output by the photoelectric conversion units 110. Results of the comparisons are output to the comparison output processing unit 160 over a signal line 106. The comparison unit 150 compares one of the plurality of analog pixel signals output from the photoelectric conversion units 110 with the reference signal. In other words, the voltage of the analog pixel signal transmitted over one of signal lines 102 to 105 is compared with the voltage of the reference signal. The comparison result is output as an electrical signal. For example, a signal having a value of "1" can be output when the voltage of the analog pixel signal is lower than the voltage of the reference signal, and a signal having a value of "0" can be output when the voltage of the analog pixel signal is higher than the voltage of the reference signal. The configuration of the comparison unit 150 will be described in detail later.

The comparison output processing unit 160 processes the comparison results output by the comparison unit 150 and outputs the processed comparison results to the conversion result holding unit 170. The processed comparison results are output to the conversion result holding unit 170 over a signal line 107. This processing can include level conversion, waveform shaping, and the like, for example.

The conversion result holding unit 170 holds the time codes output from the time code transfer units 200 as results of AD conversion based on the processed comparison results output by the comparison output processing unit 160. The conversion result holding unit 170 holds the time codes output from the time code transfer units 200 when the comparison result changes, e.g., from a value of "1" to "0". The time codes in this case are the time codes generated by the time code generation unit 20 and transferred to the area pixels 100 by the time code transfer units 200. The conversion result holding unit 170 then outputs the held time codes to the time code transfer units 200 under the control of the vertical driving unit 40. The time code transfer units 200 transfer the output time codes to the time code decoding units 52 of the horizontal control unit 50.

As described above, a signal that changes in ramp form from a high voltage to a low voltage can be used as a reference signal, and a time code can be held in the conversion result holding unit 170 when the voltage of this reference signal shifts from a voltage higher than the voltage of the analog pixel signal to a lower voltage. In other words, the time code when the analog pixel signal and the reference signal become roughly equal is held in the conversion result holding unit 170. The held time codes are converted to digital signals representing the voltage of the reference signal at the corresponding time in the time code decoding units 52. This makes it possible to AD-convert the analog pixel signals generated by the photoelectric conversion units 110.

[Configuration of Photoelectric Conversion Unit]

Figure 5:
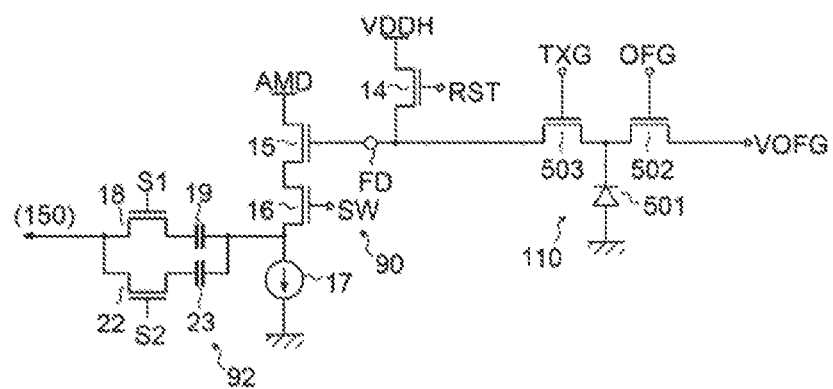
FIG. 5 is a diagram illustrating an example of the configuration of a photoelectric conversion unit according to the embodiment of the present technique.

FIG. 5 is a circuit diagram illustrating an example of the internal configurations of the photoelectric conversion unit 110, the current amplification unit 90, and the storage unit 92 in each pixel in the area pixel 100. The photoelectric conversion unit 110, the current amplification unit 90, and the storage unit 92 in FIG. 5 correspond to the internal configurations for one pixel, and four pixels' worth of the same circuit diagram illustrated in FIG. 5 are provided in the area pixel.

The photoelectric conversion unit 110 has a photodiode 501 and transistors 502 and 503. The transistor 502 performs control for discharging excess charge generated by the photodiode 501 through an overflow drain signal line OFD with an OFG signal. The transistor 503 controls whether the charge generated by the photodiode 501 is to be temporarily accumulated in a floating diffusion FD with a TXG signal.

The current amplification unit 90 has transistors 14 to 16 and a current source 17. The transistor 14 controls whether to reset the floating diffusion FD, which is connected to the gate of the transistor 15 for charge-voltage conversion, to a reset voltage, with an RST signal. Accordingly, the node where the gate of the transistor 15 and the source of transistor 14 are connected is the floating diffusion FD. As will be described below, a region where the photoelectric conversion unit 110 is disposed is different from a region where the current amplification unit 90 is disposed, and the voltages of the plurality of floating diffusions FD are transmitted and received in these regions.

The transistor 15 converts the charge generated by the photodiode 501 into a voltage based on the voltage in the floating diffusion FD. A selection transistor 16 is connected to the source of the transistor 15. The current source 17 is connected to the source of the selection transistor 16.

Figure 6:
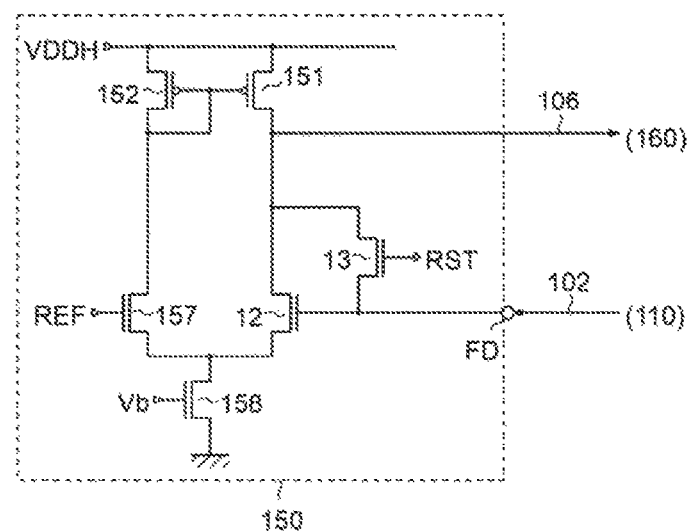
FIG. 6 is a diagram illustrating an example of the configuration of a comparison unit according to the embodiment of the present technique.

The storage unit 92 has the storage units 19 and 23 constituted by capacitors, a transistor 18 connected to the storage unit 19, and a transistor 22 connected to the storage unit 23. The source of the selection transistor 16 is connected to one end of the storage units 19 and 23. The drain of the transistor 18 is connected to the other end of the storage unit 19, and the drain of the transistor 22 is connected to the other end of the storage unit 23. Both sources of the transistors 18 and 22 are connected to an input node of the AD conversion unit 190 and the source of a transistor 13, as illustrated in FIG. 6 and described later. The transistor 18 is controlled to turn on or off by a signal S1, and the transistor 22 is controlled to turn on or off by a signal S2.

The storage unit 19 is used to hold a P-phase level of the photoelectric conversion unit 110. The storage unit 23 is used to hold a D-phase level of the photodiode. The storage units 19 and the storage units 23 of all the pixels store the P-phase level and the D-phase level at the same time. This enables a global shutter.

[Configuration of Comparison Unit]

FIG. 6 is a diagram illustrating an example of the configuration of the comparison unit 150 according to the embodiment of the present technique. The comparison unit 150 includes a signal input transistor 12, a reference input transistor 157, and MOS transistors 13, 151, and 152. Here, P-channel MOS transistors can be used as the MOS transistors 151 and 152. N-channel MOS transistors can be used as the MOS transistors 12 and 157.

In addition to the signal line 102 and the like described above, a plurality of signal lines (Vb and REF) and a power line VDDH are connected to the comparison unit 150. A bias signal line Vb (Bias) is a signal line that supplies a bias voltage to the MOS transistor 158. A reference signal line REF (Reference) is a signal line that carries a reference signal to the reference input transistor 157. The power line VDDH is a power line that supplies power to the comparison unit 150.

The sources of the MOS transistors 151 and 152 are connected in common to the power line VDDH. The gate of the MOS transistor 151 is connected to the gate and the drain of the MOS transistor 152, and to the drain of the reference input transistor 157. The drain of the MOS transistor 151 is connected to the drain of the signal input transistor 12, and to the signal line 106. The source of the signal input transistor 12 and the source of the reference input transistor 157 are connected in common to the drain of the MOS transistor 158. The gate of the MOS transistor 158 is connected to the bias signal line Vb, and the source is grounded. The gate of the MOS transistor 12 is connected to the signal line 102. The MOS transistor 13 shorts the gate and the drain of the MOS transistor 12 when a reset signal RST is at high level. The gate of the reference input transistor 157 is connected to the reference signal line REF.

The signal input transistor 12 is a MOS transistor in which an input signal is input to the gate, which is the control terminal. The analog pixel signal is input as the input signal to the gate of the signal input transistor 12 illustrated in this drawing.

The reference input transistor 157 is a MOS transistor in which a reference signal is input to the gate, which is the control terminal. The reference input transistor 157 forms a differential pair with the signal input transistor 12. The input signal in the reference signal are compared by this differential pair. Specifically, when the input signal is lower than the reference signal, current flowing in the reference input transistor 157 is greater than current flowing in the signal input transistor 12. Conversely, when the input signal is higher than the reference signal, current flowing in the reference input transistor 157 is smaller than current flowing in the signal input transistor 12. In this manner, current according to the difference between the input signal and the reference signal flows in the signal input transistor 12 and the reference input transistor 157 that form the differential pair.

When the current flowing in either one of the signal input transistor 12 and the reference input transistor 157 changes according to the difference between the input signal and the reference signal, the MOS transistor 151 converts this current change into a voltage change. The MOS transistor 152 converts a change in the current flowing in the reference input transistor 157 into a voltage change. The MOS transistors 151 and 152 therefore form a current mirror circuit. This current mirror circuit acts such that a current equal to the current flowing in the reference input transistor 157 flows in the signal input transistor 12. This makes it possible to quickly compare the input signal with the reference signal.

The MOS transistor 158 controls the current flowing in the signal input transistor 12 and the reference input transistor 157 that form the differential pair. A predetermined bias voltage is supplied to the gate of the MOS transistor 158 by the bias signal line Vb. The MOS transistor 158 therefore operates as a constant current power supply.

In this manner, the comparison unit 150 illustrated in the drawing can be caused to perform an operation of comparing the pixel signal input to the gate of the signal input transistor 12 with the reference signal input to the gate of the reference input transistor 157.

[Selection Method]

First, the voltage on the reference signal line REF is set to 0 V. This puts the reference input transistor 157 into a non-conductive state. Then, due to the action of a differential amplifier circuit constituted by the signal input transistor 12, the reference input transistor 157, and the MOS transistor 158, the drain of the signal input transistor 12 becomes a voltage near 0 V. Next, the reset signal RST is set to high level to turn the MOS transistor 13 on. This forms a feedback circuit, and the drain of the signal input transistor 12 becomes a voltage of about 0 V. Then, the floating diffusion FD of the photoelectric conversion unit 110 connected to the signal line 102 is discharged, and the voltage on the signal line 102 becomes 0 V.

The current mirror circuit constituted by the MOS transistors 151 and 152 can further improve the action of bringing the drain of the signal input transistor 12 to 0 V. In other words, when the voltage of the reference signal line REF is brought to 0 V, the current flowing in the MOS transistor 152 becomes about 0 A. Because the MOS transistor 151 and the MOS transistor 152 constitute a current mirror circuit, the current flowing in the MOS transistor 151 also becomes about 0 A. Accordingly, the voltage at the drain of the signal input transistor 12 can be more accurately brought to 0 V.

Note that the MOS transistor 13 may further have a function for resetting the floating diffusion FD of the photoelectric conversion unit 110. This reset can be performed as follows. First, a voltage equivalent to the reset voltage of the floating diffusion FD is applied to the reference signal line REF. This puts the reference input transistor 157 into a conductive state. The actions of the above-described differential amplifier circuit and current mirror circuit also cause the voltage at the drain of the MOS transistor 13 to become a value substantially equal to the reset voltage. Next, the reset signal RST is set to high level to put the MOS transistor 13 into a conductive state. As a result, the reset voltage is applied to the floating diffusion FD of the photoelectric conversion unit 110, and a reset can therefore be performed.

In this manner, in one embodiment of the present technique, the floating diffusion FD is reset using the MOS transistor 13. This makes it possible to simplify the configuration of the AD conversion unit 190. Additionally, using the current mirror circuit makes it possible to improve the gain in the differential amplifier circuit, which in turn makes it possible to reset the floating diffusion FD more accurately.

Note that the configuration of the comparison unit 150 is not limited to this example. For example, a resistive load or a constant current power supply can also be used instead of the MOS transistors 151 and 152 constituting the current mirror circuit. In this case, the resistive load or the like can be connected to one or both of the signal input transistor 12 and the reference input transistor 157 in the differential pair.

[Configuration of Comparison Output Processing Unit]

Figure 7:
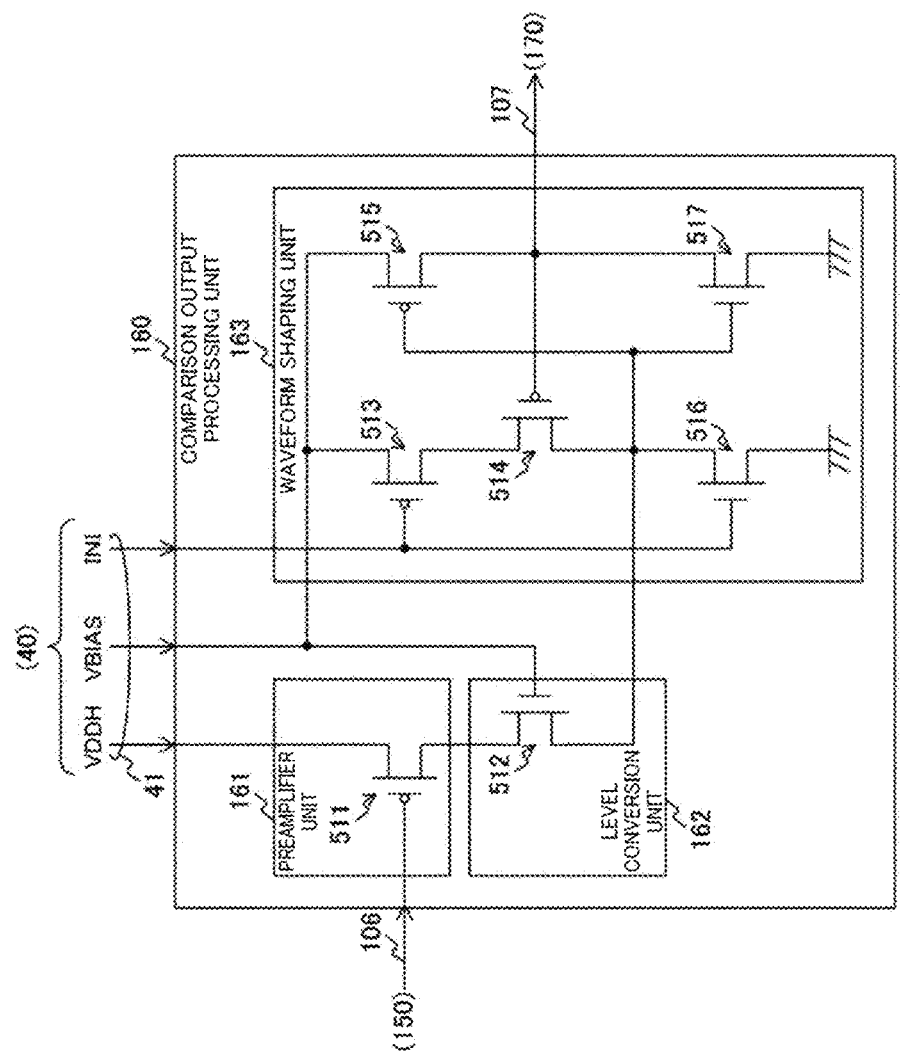
FIG. 7 is a diagram illustrating an example of the configuration of a comparison output processing unit according to the embodiment of the present technique.

FIG. 7 is a diagram illustrating an example of the configuration of the comparison output processing unit 160 according to the embodiment of the present technique. The comparison output processing unit 160 includes MOS transistors 511 to 517. Here, the MOS transistors 511, 513, and 515 can be constituted by P-channel MOS transistors. The MOS transistors 512, 514, 516, and 517 can be constituted by N-channel MOS transistors. The MOS transistor 511 constitutes a preamplifier unit 161. The MOS transistor 512 constitutes a level conversion unit 162. The MOS transistors 513 to 517 constitute a waveform shaping unit 163. In addition to the above-described signal lines 106 and 107, an initialization signal line INI (Initialize) and the power lines (VDDH and VBIAS) are connected to the comparison output processing unit 160. The initialization signal line INI is a signal line that carries control signals to the MOS transistors 513 and 516. The power lines VDDH and VBIAS are power lines that supply power to the comparison output processing unit 160.

The source and gate of the MOS transistor 511 are connected to the power line VDDH and the signal line 106, respectively. The drain of the MOS transistor 511 is connected to the drain of the MOS transistor 512. The gate of the MOS transistor 512 is connected to the power line VBIAS, and the source is connected to the drains of the MOS transistors 514 and 516 as well as the gates of the MOS transistors 515 and 517. The gates of the MOS transistors 513 and 516 are connected in common to the initialization signal line INI. The source and drain of the MOS transistor 513 are connected to the power line VBIAS and the source of the MOS transistor 514, respectively. The source of the MOS transistor 516 is grounded. The gate of the MOS transistor 514 is connected to the drains of the MOS transistors 515 and 517, as well as to the signal line 107. The source of the MOS transistor 515 is connected to the power line VBIAS, and the source of the MOS transistor 517 is grounded.

The preamplifier unit 161 amplifies the signal corresponding to the comparison results output by the comparison unit 150. The preamplifier unit 161 outputs the amplified signal to the level conversion unit 162. This amplification is performed by the MOS transistor 511.

The level conversion unit 162 converts the level of the signal output by the preamplifier unit 161. The power line VDDH is connected to the comparison unit 150 and the preamplifier unit 161 described with reference to FIG. 6. To obtain a high gain in the comparison unit 150 and the preamplifier unit 161, it is necessary to set the power supplied by the power line VDDH to a relatively high voltage. On the other hand, the conversion result holding unit 170 and the like in later stages handle digital signals, and can therefore be supplied with power at a relatively low voltage. This relatively low-voltage power is supplied by the power line VBIAS. This reduces the power consumed by the conversion result holding unit 170 and the like, and also makes it possible to use low-breakdown voltage transistors for the conversion result holding unit 170 and the like. In this manner, the level conversion unit 162 is provided to carry signals between circuits to which power is supplied at different voltages. As a result, a signal for which the level has been converted is output to the waveform shaping unit 163. The level conversion unit 162 in this drawing can limit the signal level to a voltage obtained by subtracting a threshold voltage of the MOS transistor 512 from the voltage of the power supplied by the power line VBIAS.

The waveform shaping unit 163 shapes the signal output by the level conversion unit 162 to a signal having a steep change. The operations of the waveform shaping unit 163 will be described later. In an initial state, the output of the level conversion unit 162 has a value of "0". In this state, a signal having a value of "1" is input from the initialization signal line INI, and the MOS transistor 516 enters a conductive state. As a result, the MOS transistor 517 enters a non-conductive state, the MOS transistor 515 enters a conductive state, and a value of "1" is output to the signal line 107. At this time, the MOS transistors 513 and 514 enter a non-conductive state. Thereafter, a signal having a value of "0" is input to the initialization signal line INI. As a result, the MOS transistor 513 enters a conductive state, and the MOS transistor 516 enters a non-conductive state. The MOS transistor 514 is in a non-conductive state and the output signal from the level conversion unit 162 has a value of "0", and thus the states of the MOS transistors 515 and 517 do not change.

Next, when the value of the output signal from the level conversion unit 162 changes from "0" to "1", the MOS transistor 517 transitions to a conductive state, and the MOS transistor 515 transitions to a non-conductive state. The voltage on the signal line 107 drops as a result. This causes the MOS transistor 514 to transition to a conductive state, and the voltage at the gates of the MOS transistors 515 and 517 rises further as a result. This positive feedback effect causes the voltage on the signal line 107 to drop sharply. This makes it possible to shape the waveform.

[Configuration of Conversion Result Holding Unit]

Figure 8:
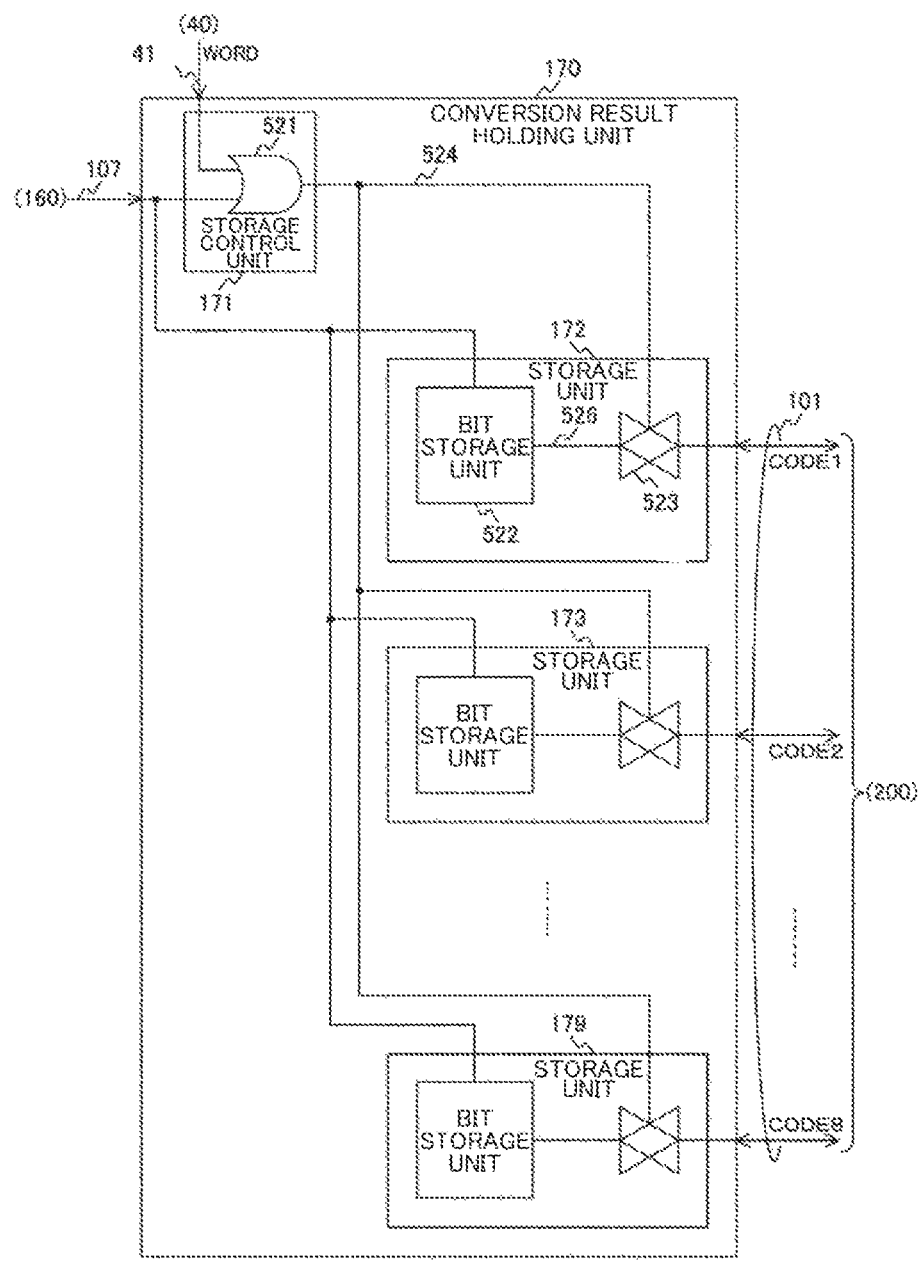
FIG. 8 is a diagram illustrating an example of the configuration of a conversion result holding unit according to the embodiment of the present technique.

FIG. 8 is a diagram illustrating an example of the configuration of the conversion result holding unit 170 according to the embodiment of the present technique. This conversion result holding unit 170 includes a storage control unit 171 and storage units 172 to 179. For the sake of convenience, data having a size of 8 bits is assumed as the post-AD conversion digital pixel signal. The size of the time code is therefore 8 bits as well. The sizes of the post-conversion digital pixel signal and the time code can be changed according to the requirements of the system. For example, a size of 15 bits can also be used.

In addition to signal line 107, a plurality of signal lines (WORD and CODE1 to 8) are connected to the conversion result holding unit 170. The word signal line WORD (Word) is a signal line that carries control signals for the storage units 172 to 179. The code signal lines CODE (Code) 1 to 8 are signal lines that carry time codes in both directions. The plurality of code signal lines CODE1 to 8 constitute the signal line 101.

The storage units 172 to 179 store the time codes input from the time code transfer units 200. The storage units 172 to 179 each store a 1-bit time code. The configurations of the storage units 172 to 179 will be described using the storage unit 172 as an example. The storage unit 172 includes a bit storage unit 522 and a bidirectional switch 523.

The bidirectional switch 523 is connected between a signal line 526 and the code signal line CODE1, and carries data bidirectionally. This bidirectional switch 523 also includes a control input terminal. A signal line 524 is connected to this control input terminal. When a value of "1" is input to the control input terminal over the signal line 524, the bidirectional switch 523 enters a conductive state, and data can be carried in both directions over the signal line 526 and the code signal line CODE1. On the other hand, when a value of "0" is input to the control input terminal, the bidirectional switch 523 enters a non-conductive state. The bit storage unit 522 is a storage device that stores 1-bit data. The bit storage unit 522 includes an input/output terminal and a control input terminal, to which the signal lines 526 and 107 are respectively connected. When a signal having a value of "1" is input to the control input terminal over the signal line 107, the bit storage unit 522 stores a 1-bit time code, which is the signal transmitted from the bidirectional switch 523 over the signal line 526. At this time, if the 1-bit time code changes, the data stored in the bit storage unit 522 is overwritten. Then, when the signal input to the control input terminal transitions from a value of "1" to "0", the data stored in the bit storage unit 522 is held as-is. In other words, the stated data overwrite is not performed until the next time the signal input to the control input terminal has a value of "1". When the signal input to the control input terminal has a value of "0", the bit storage unit 522 outputs the held data to the signal line 526.

The storage control unit 171 outputs control signals over signal line 524 to control the storage units 172 to 179. The storage control unit 171 can generate and output, for example, a signal obtained by the logical OR of the two signals input by the word signal line WORD and the signal line 107, as the control signal for the bidirectional switch 523. This can be performed by an OR gate 521.

[Configuration of Time Code Transfer Unit]

Figure 9:
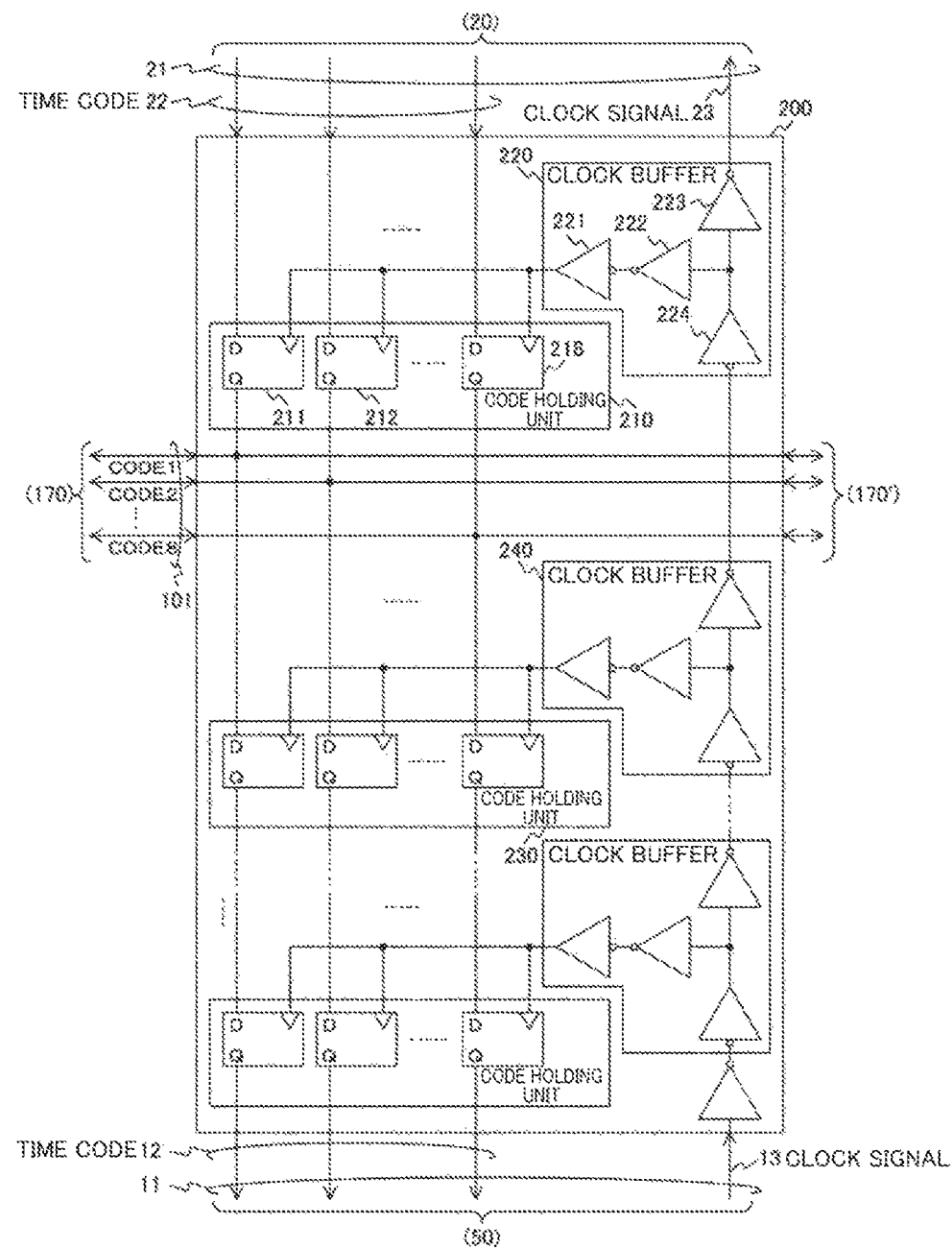
FIG. 9 is a diagram illustrating an example of the configuration of a time code transfer unit according to the embodiment of the present technique.

FIG. 9 is a diagram illustrating an example of the configuration of the time code transfer units 200 according to the embodiment of the present technique. Each time code transfer unit 200 includes code holding units 210 and 230, and clock buffers 220 and 240. The time code transfer unit 200 has the same number of code holding units and clock buffers as the number of rows of the area pixels 100 disposed in the pixel array unit 10 described with reference to FIG. 1. For the sake of convenience, the code holding units 210 and 230 and the clock buffers 220 and 240 will be described as examples.

The code holding unit 210 holds the time code. The code holding unit 210 is constituted by flip-flops 211 to 218. The flip-flop 211 and the like hold one bit of the time code based on a clock signal output from the clock buffer 220. Specifically, when the clock signal has a value of "0", the time code output from the time code generation unit 20 and input to a D input terminal in the drawing is held in an internal node, and a Q output terminal is put into a high-impedance state. Next, when the clock signal takes on a value of "1", the time code held in the internal node is output from the Q output terminal. The output time code is input to the code holding unit 230 over the signal line 101. In this manner, the time code transfer unit 200 transfers time codes by operating the plurality of time code holding units as shift registers.

The clock buffer 220 outputs the clock signal generated by the clock signal generation unit 54 described with reference to FIG. 3 to the code holding unit 210, as well as to the clock buffer in the next stage. The clock buffer 220 is constituted by of a plurality of inverting gates 221 to 224, and functions as a repeater to shape a degraded clock signal. The clock buffer 220 sequentially transfers in the opposite direction of the time codes in the time code transfer unit 200. In other words, the clock buffer 240 outputs a clock signal to the code holding unit 230, and outputs a clock signal to the clock buffer 220. As a result, the clock signal input to the code holding unit 210 has a time delay equivalent to the propagation delay time of two inverting gates and delay produced by the wiring to the inverting gate 224, compared to the clock signal input to the code holding unit 230. In this manner, the clock buffer 220 further has a function for delaying the clock signal.

As described above, the flip-flop 211 and the like hold the input time code in an internal node when the clock signal has a value of "0". When holding at this time, it is necessary to provide a predetermined amount of time, which is known as a "setup time". Due to the delay in the clock signal produced by the clock buffer 220, when the clock signal transitions to a value of "0" in the code holding unit 230, the clock signal input to the code holding unit 210 stays at a value of "1". In other words, the time code held in the internal node stays being output. This makes it possible to provide the setup time in the code holding unit 230, and makes it possible to transmit the time code.

The code signal lines CODE1 to 8 are connected to the output of the code holding unit 210 and the input of the code holding unit 230, respectively. As a result, the time codes generated by the time code generation unit 20 and held in the code holding unit 210 are then output to the conversion result holding unit 170 over the code signal lines CODE1 to 8. The time codes held in the conversion result holding unit 170 after the AD conversion are output to the code holding unit 230 over the code signal lines CODE1 to 8. In this manner, the time code transfer unit 200 transfers the time codes.

The internal configuration of the area pixel 100 will be described next. Because there are various candidates for the internal configuration of the area pixel 100, typical internal configurations will be described below in order.

(Image Capture Timing of Image Capturing Apparatus)

Figure 10:
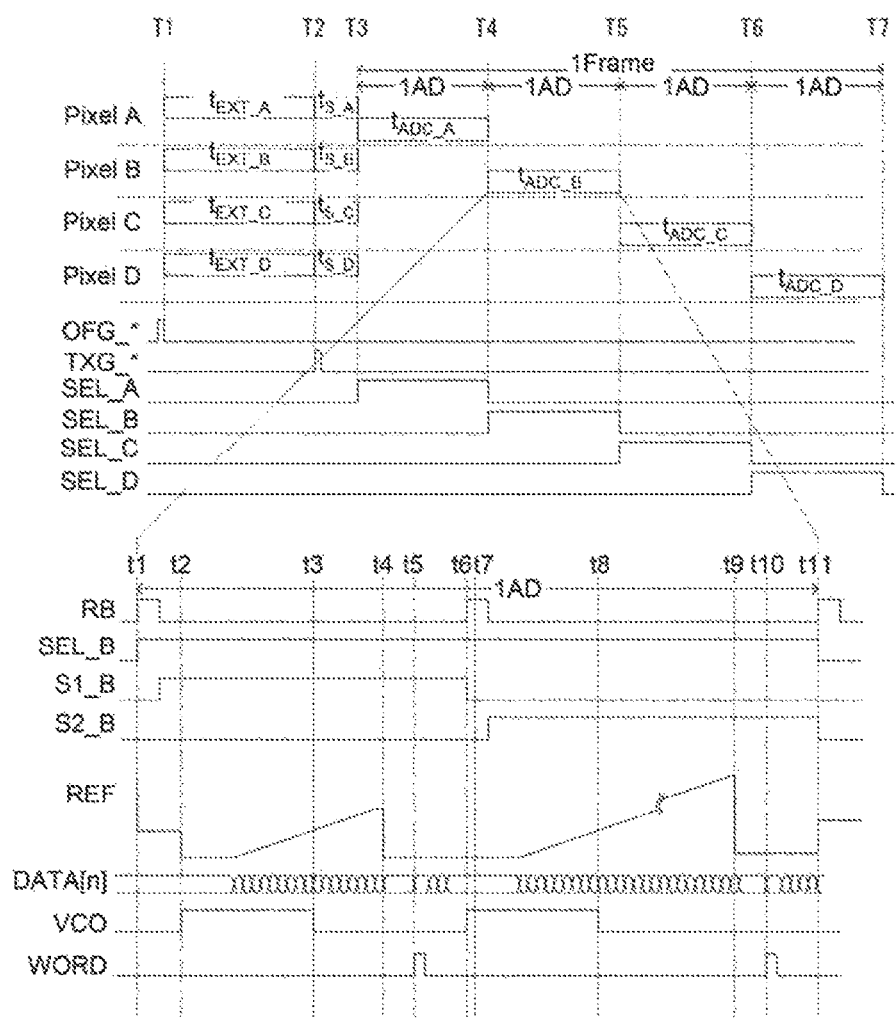
FIG. 10 is a timing chart for one frame period of the image capturing apparatus according to the present disclosure.

FIG. 10 is a timing chart for one frame period of the image capturing apparatus according to the present disclosure. The image capturing apparatus according to the present disclosure exposes all pixels simultaneously using a global shutter method, AD converts the pixel signals obtained from the exposure in units of area pixels, and outputs the resulting signals. The upper half of FIG. 10 illustrates the timing of one frame period (time T3 to T7) after the start of exposure at time T1. The lower half of FIG. 10 is a timing chart illustrating details of the operations from time T4 to T5.

Time T1 to T2 is an exposure period. Just before time T1, the OFG signal goes to high level, the transistor 502 turns on, and the charge in the photodiode 501 is discharged through the overflow drain signal line OFD. Within the exposure period of T1 to T2, the photodiode 501 continuously performs photoelectric conversion and accumulates a charge. At time T2, a transfer signal TXG goes to high level, the transistor 503 turns on, and the charge resulting from the photoelectric conversion in the photodiode 501 is held in the floating diffusion FD. The operation for holding the charge in the floating diffusion FD is performed simultaneously for all pixels.

The four pixels in the area pixel are then read out sequentially. At time T3 to T4 in FIG. 10, a pixel A in the area pixel is read out; at time T4 to T5, a pixel B in the area pixel is read out; at time T5 to T6, a pixel C in the area pixel is read out; and at time T6 to T7, a pixel D in the area pixel is read out.

The readout operation for the pixel B will be described in detail hereinafter. A signal RB in the timing chart in the lower half of FIG. 10 is the reset signal RST input to the gate of the transistor 13 in the pixel B. A signal SEL_B is a selection signal SW input to the gate of the transistor 16 in the pixel B. A signal S1_B is the signal S1 input to the gate of the transistor 18 in the pixel B. A signal S2_B is the signal S2 input to the gate of the transistor 23 in the pixel B.

When the signal RB goes to high level at time t1, the drain voltage of the transistor 12 in the AD conversion unit 190 is initialized. The transistor 16 is on during the readout of the pixel B (time t1 to t11). The signal S1_B then goes to high level, the transistor 18 turns on, and a P-phase signal is stored in the storage unit 19. The P-phase signal stored in the storage unit 19 is input to the gate of the transistor 12. The period from time t1 to t6 is a period in which the P-phase signal is compared with the reference signal and the P-phase signal is converted to a digital signal.

Between time t2 and t4, the reference signal REF, which is a ramp wave having a signal level that changes linearly, is input to the gate of the transistor 157. When the signal level of the P-phase signal exceeds the signal level of the reference signal REF, the drain voltage of transistor 12 in the differential pair falls, the drain voltage of the transistor 151 rises, and an output signal VCO from the AD conversion unit goes to low level (time t3).

When the signal RB then goes to high level at time t6, the drain voltage of the transistor 12 in the AD conversion unit is initialized. The signal S2_B then goes to high level, the transistor 23 turns on, and a D-phase signal is stored in the storage unit 23.

The period from time t7 to t11 is a period in which the D-phase signal is compared with the reference signal and the D-phase signal is converted to a digital signal. Between time t7 and t9, the reference signal REF, which is a ramp wave having a signal level that changes linearly, is input to the gate of the transistor 157. When the signal level of the D-phase signal exceeds the signal level of the reference signal REF, the drain voltage of transistor 12 in the differential pair falls, the drain voltage of the transistor 151 rises, and an output signal VCO from the AD conversion unit goes to low level (time t8).

In this manner, the AD conversion unit compares the P-phase signal stored in the storage unit 19 and the D-phase signal stored in the storage unit 23 with the reference signal, and outputs the signal VCO indicating the timing at which the signals match the reference signal.

First Example of Area Pixel 100

Figure 12:
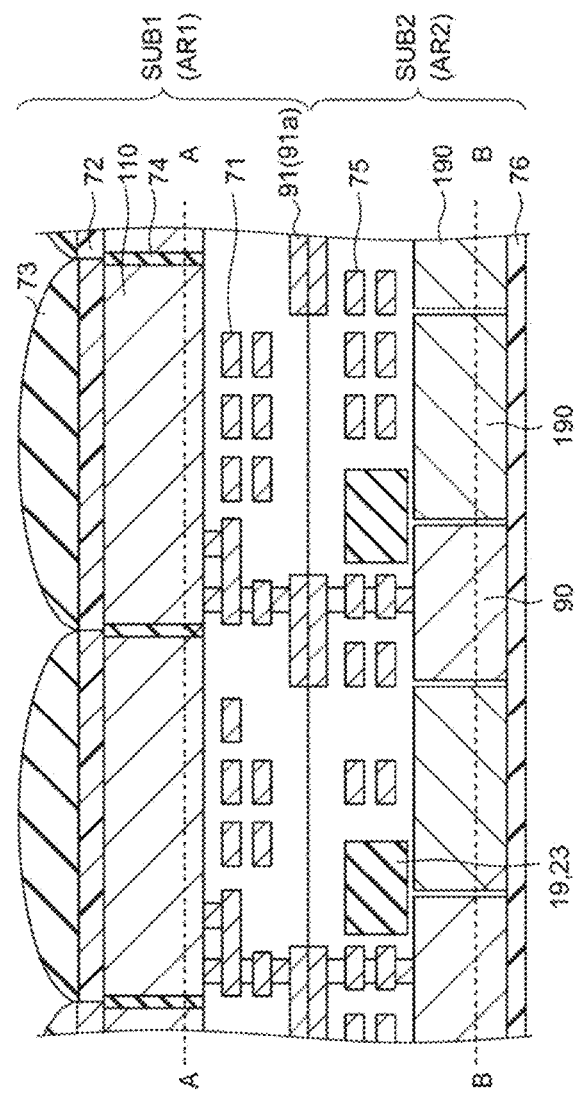
FIG. 12 is a cross-sectional view of the area pixel according to the first example.
Figure 13A:
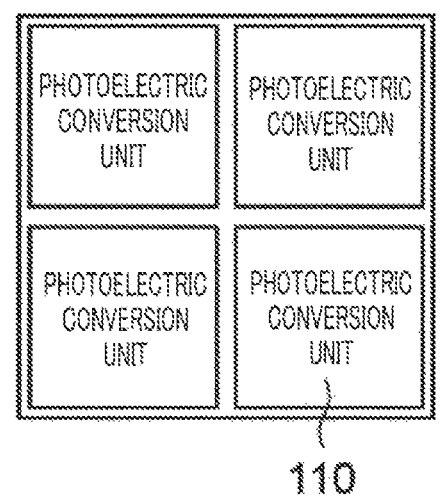
FIG. 13A is a plan view in the direction of line A-A in FIG. 12.
Figure 13B:
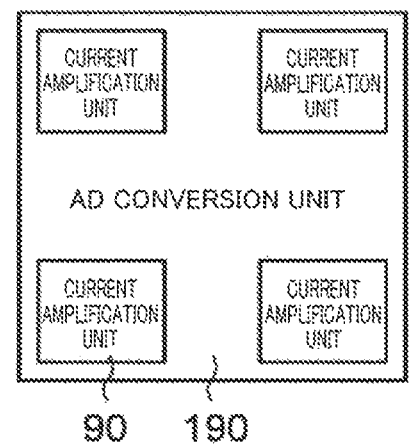
FIG. 13B is a plan view in the direction of line B-B in FIG. 12.

FIG. 11 is a circuit diagram illustrating the area pixel 100 according to a first example; FIG. 12 is a cross-sectional view of the area pixel 100 according to the first example; FIG. 13A is a plan view in the direction of line A-A in FIG. 12; and FIG. 13B is a plan view in the direction of line B-B in FIG. 12. FIGS. 11, 12, 13A and 13B illustrate an example of an area pixel 100 having four pixels. The image capturing apparatus 1 including the area pixel 100 according to the first example uses a global shutter system, and the storage units 19 and 23 are connected to the photoelectric conversion unit 110 in each pixel.

The area pixel 100 in FIG. 11 has a plurality of the photoelectric conversion units 110, a plurality of the current amplification units 90, a plurality of the storage units 19 and 23, and the AD conversion unit 190. The plurality of photoelectric conversion units 110, the plurality of current amplification units 90, and the plurality of storage units 19 and 23 share the single AD conversion unit 190. The circuit configurations in the area pixel 100 in FIG. 11 are the same as in FIGS. 5 and 6.

Each photoelectric conversion unit 110 in the area pixel 100 in FIG. 11 has the photodiode 501 and the transistors 502 and 503, as in FIG. 5. The current amplification unit 90 has the transistors 14 to 17 and the current source 17. The gate of the transistor 15 is connected to the floating diffusion FD. The storage unit 19 is used to store the P-phase signal. The storage unit 23 is used to store the D-phase signal.

As illustrated in FIG. 12, the image capturing apparatus 1 including the area pixel 100 according to the first example has a first region AR1 in which the photoelectric conversion unit 110 is disposed, and a second region AR2 in which the current amplification unit 90, the storage units 19 and 23, and the AD conversion unit 190 are disposed. The first region AR1 and the second region AR2 both have semiconductor layers constituted by silicon. The first region AR1 is located on a first substrate SUB1. The second region AR2 is located on a second substrate SUB2. The first region AR1 occupies the entire surface area of the substrate surface of the first substrate SUB1, and the second region AR2 occupies the entire surface area of the substrate surface of the second substrate SUB2. The first region AR1 and the second region AR2 have the same surface area.

As illustrated in FIG. 12, a wiring layer 71, the photoelectric conversion unit 110, a color filter 72, and an on-chip lens 73 are layered on the first substrate SUB1. An element separation layer 74 is disposed between the pixels. A wiring layer 75, the current amplification unit 90, the AD conversion unit 190, and a protective layer 76 are layered on the second substrate SUB2. The layer configurations of the first substrate SUB1 and the second substrate SUB2 illustrated in FIG. 12 are examples, and many variations are conceivable.

As illustrated in FIGS. 12 and 13A, a plurality of the photoelectric conversion units 110 are disposed in the first region AR1. The photoelectric conversion units 110 are provided throughout the entire first region AR1. As illustrated in FIG. 11, the voltage signal from the floating diffusion FD is output from the first region AR1 and input to the second region AR2.

As illustrated in FIGS. 12 and 13B, the storage units 19 and 23, the current amplification units 90, and the AD conversion unit 190 are disposed in the second region AR2. In the second region AR2, the storage units 19 and 23 and the current amplification units 90 are provided on a pixel-by-pixel basis, whereas the AD conversion unit 190 is shared by a plurality of pixels. The storage units 19 and 23 are disposed in a different layer on the second substrate SUB2 from the layer in which the current amplification units 90 and the AD conversion unit 190 are disposed. In this manner, the second region AR2 is formed from a plurality of layers that are stacked. As illustrated in FIG. 13B, in the layer where the plurality of current amplification units 90 and the AD conversion unit 190 are disposed, the plurality of current amplification units 90 are disposed at distances from each other, and the AD conversion unit 190 is disposed in a region where the plurality of current amplification units 90 are not disposed.

The first region AR1 and the second region AR2 transmit and receive various signals over a signal transmission unit 91, which extends in the layering direction. The signal transmission unit 91 transmits and receives the floating diffusion voltages between the first substrate AR1 and the second substrate AR2 using a Cu—Cu connection 91a, for example. Instead of a Cu—Cu connection, the signal transmission unit 91 may transmit and receive the floating diffusion voltages using other bonding means, such as bumps.

In this manner, in the area pixel 100 according to the first example, the photoelectric conversion units 110 are disposed in the first region AR1; the storage units 19 and 23, the current amplification units 90, and the AD conversion unit 190 are disposed in the second region AR2; and the first region AR1 and the second region AR2 transmit and receive the voltage from the floating diffusion FD. Because the entirety of the first region AR1 is used as the region where the photoelectric conversion units 110 are disposed, the surface area of the photoelectric conversion units 110 can be expanded, which makes it possible to increase the numerical aperture, improve the resolution by reducing the size of the area pixel 100, and the like.

Additionally, using a layered structure for the second region AR2 makes it possible to broaden the surface area for disposing the storage units 19 and 23, the current amplification units 90, and the AD conversion unit 190.

Second Example of Area Pixel 100

Figure 14:
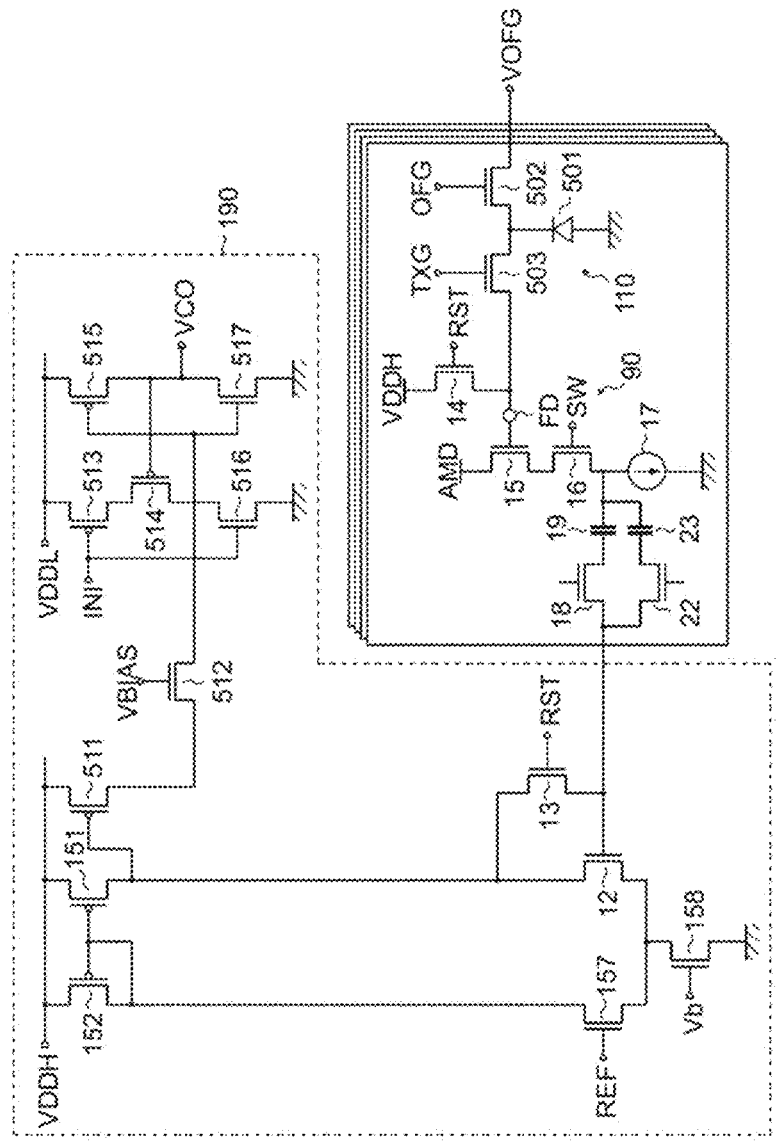
FIG. 14 is a circuit diagram of an area pixel according to a second example.
Figure 15:
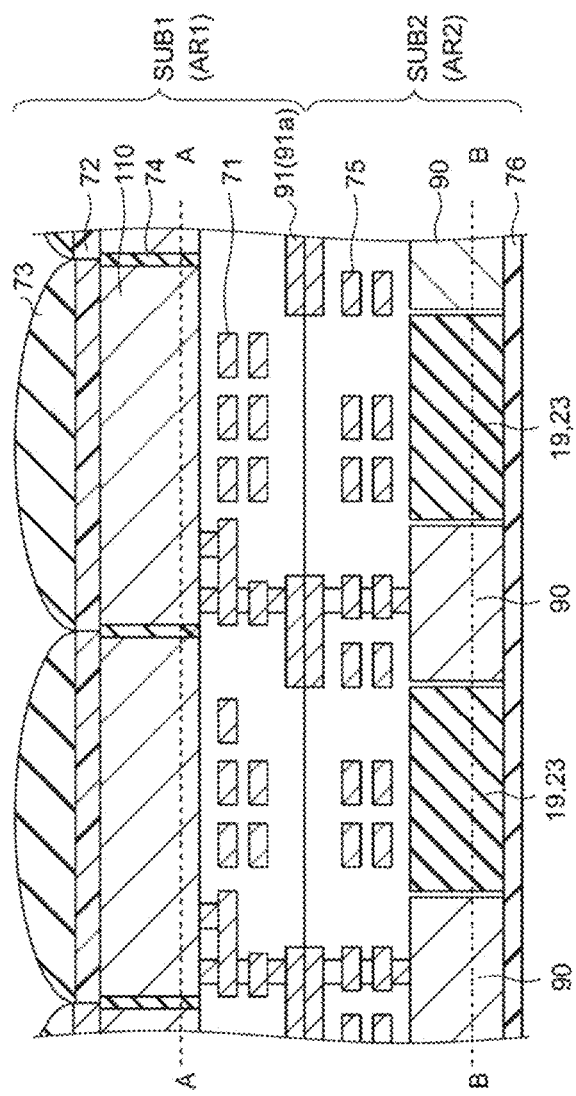
FIG. 15 is a cross-sectional view of the area pixel according to the second example.
Figure 16A:
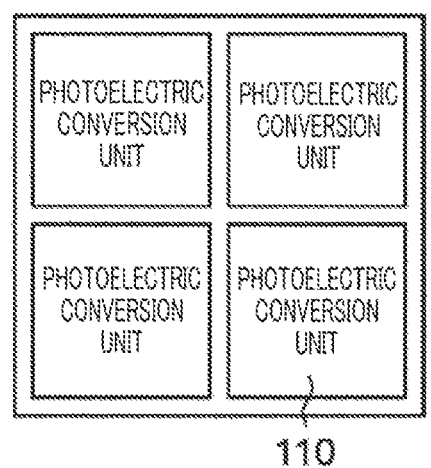
FIG. 16A is a plan view in the direction of line A-A in FIG. 15.
Figure 16B:
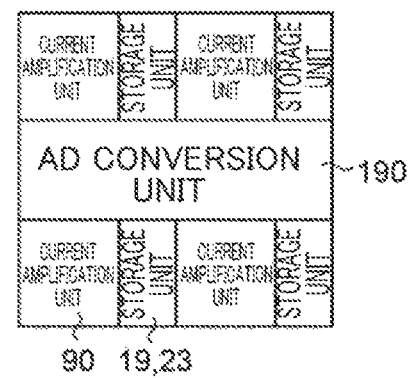
FIG. 16B is a plan view in the direction of line B-B in FIG. 15.

FIG. 14 is a circuit diagram illustrating the area pixel 100 according to a second example; FIG. 15 is a cross-sectional view of the area pixel 100 according to the second example; FIG. 16A is a plan view in the direction of line A-A in FIG. 15; and FIG. 16B is a plan view in the direction of line B-B in FIG. 15. The following will focus on the differences from the area pixel 100 according to the first example.

The area pixel 100 according to the second example is the same as the first example in that the layered first region AR1 and the second region AR2 are provided, and the photoelectric conversion units 110 are disposed in the first region AR1. The second example differs from the first example in terms of the layout arrangement of the second region AR2. The circuit diagram in FIG. 14 according to the second example is similar to the circuit diagram in FIG. 11 according to the first example, but the cross-sectional structure and planar configuration in the second example are different from those in the first example.

As illustrated in FIGS. 15 and 16B, the storage units 19 and 23, the current amplification units 90, and the AD conversion unit 190 are disposed in the same layer in the second region AR2. As illustrated in FIG. 16B, the current amplification units 90 and the storage units 19 and 23 for four pixels are arranged symmetrically along the two opposing sides of the rectangular range of the area pixel 100, and the AD conversion unit 190 is disposed in a central area therebetween. Although the AD conversion unit 190 is not shown in the cross-sectional view in FIG. 15, the AD conversion unit 190 is actually disposed to the back in the cross-section in FIG. 15, as illustrated in FIG. 16B.

In the area pixel 100 according to the second example as well, the first region AR1 is located on the first substrate SUB1, and the second region AR2 is located on the second substrate SUB2. The first substrate SUB1 and the second substrate SUB2 transmit and receive the voltage of the floating diffusion FD of the photoelectric conversion unit 110 through the signal transmission unit 91, which is constituted by the Cu—Cu connection 91a.

Third Example of Area Pixel 100

Figure 17:
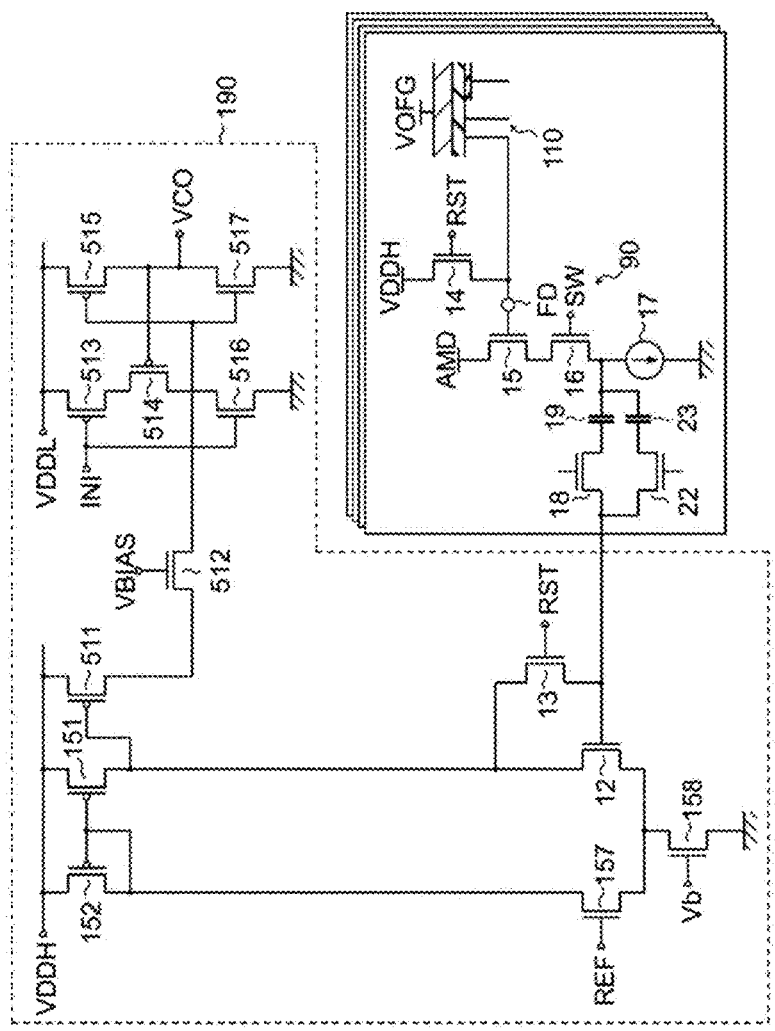
FIG. 17 is a circuit diagram of an area pixel according to a third example.
Figure 18:
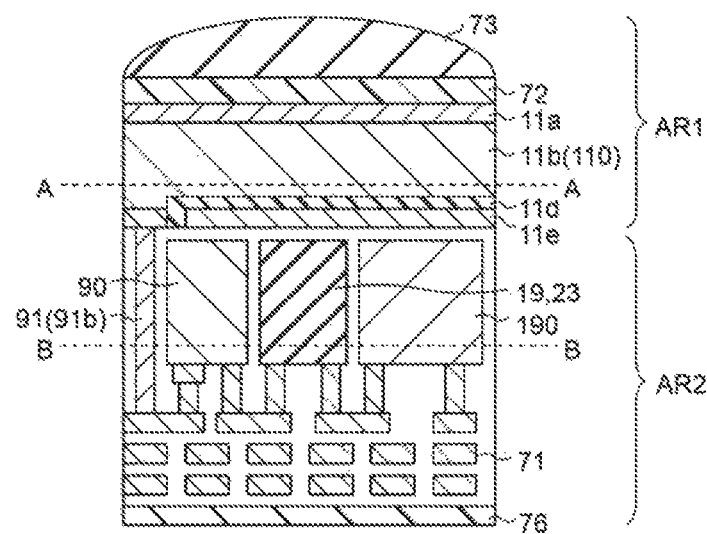
FIG. 18 is a cross-sectional view of the area pixel according to the third example.
Figure 19A:
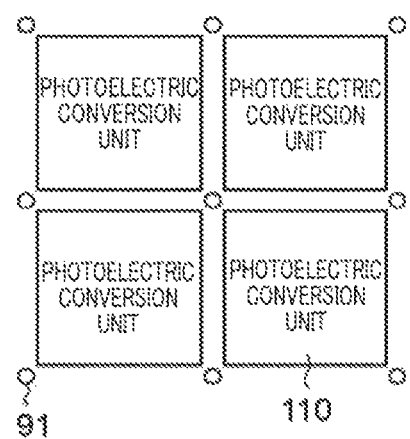
FIG. 19A is a plan view in the direction of line A-A in FIG. 18.
Figure 19B:
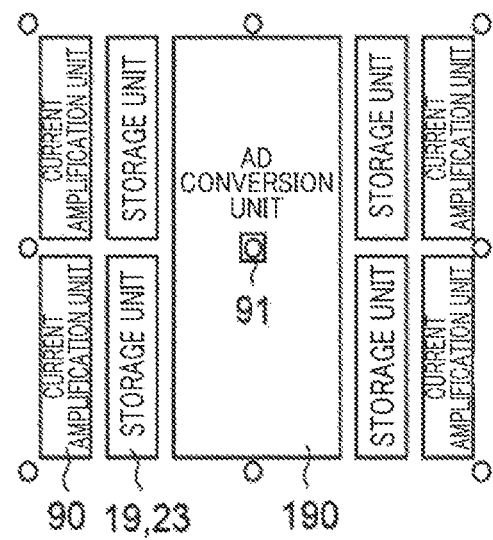
FIG. 19B is a plan view in the direction of line B-B in FIG. 18.

FIG. 17 is a circuit diagram illustrating the area pixel 100 according to a third example; FIG. 18 is a cross-sectional view of the area pixel 100 according to the third example; FIG. 19A is a plan view in the direction of line A-A in FIG. 18; and FIG. 19B is a plan view in the direction of line B-B in FIG. 18. FIGS. 17, 18, 19A and 19B illustrate an example of an area pixel 100 having four pixels.

The area pixel 100 according to the third example has the photoelectric conversion unit 110, which is formed from a material other than silicon. The material other than silicon is an organic material, for example. In this manner, the photoelectric conversion unit 110 of the third example has a semiconductor layer containing a material other than silicon. More specifically, the photoelectric conversion unit 110 of the third example has a structure in which an upper electrode layer 11a, a photoelectric conversion layer 11b, an insulating layer 11d, and a lower electrode layer 11e are layered, as illustrated in FIG. 18. The material of the upper electrode layer 11a and the lower electrode layer 11e is Indium Tin Oxide (ITO), Indium Zinc Oxide (IZO), or the like, for example.

The circuit diagram in FIG. 17 is the same as the circuit diagram in FIG. 11, except for the type of photoelectric conversion unit 110 being different.

The area pixel 100 according to the third example includes the layered first region AR1 and second region AR2. The photoelectric conversion units 110 formed from a material other than silicon are disposed in the first region AR1. The storage units 19 and 23, the current amplification units 90, and the AD conversion unit 190, which are formed from silicon, are disposed in the second region AR2. As illustrated in FIG. 18, the current amplification units 90, the storage units 19 and 23, and the AD conversion unit 190 are disposed in the same layer. The wiring layer 71 is disposed below that layer, and the protective layer 76 is disposed below the wiring layer 71.

The first region AR1 and the second region AR2 are layered on the same substrate. In the second region AR2, the storage units 19 and 23 and the current amplification units 90 are provided on a pixel-by-pixel basis, whereas the AD conversion unit 190 is shared by a plurality of pixels.

The first region AR1 and the second region AR2 transmit and receive the voltage of the floating diffusion FD of the photoelectric conversion units 110 through the signal transmission unit 91, which is constituted by a via 91b, for each pixel in the area pixel 100.

As illustrated in FIG. 19A, the photoelectric conversion units 110 disposed in the first region AR1 are provided located throughout the entire rectangular range of the area pixel 100. As illustrated in FIG. 19B, in the second region AR2, the current amplification units 90 and the storage units 19 and 23 for four pixels are arranged symmetrically along the two opposing sides of the rectangular range of the area pixel 100, and the AD conversion unit 190 is disposed in a central area therebetween.

Fourth Example of Area Pixel 100

Figure 20:
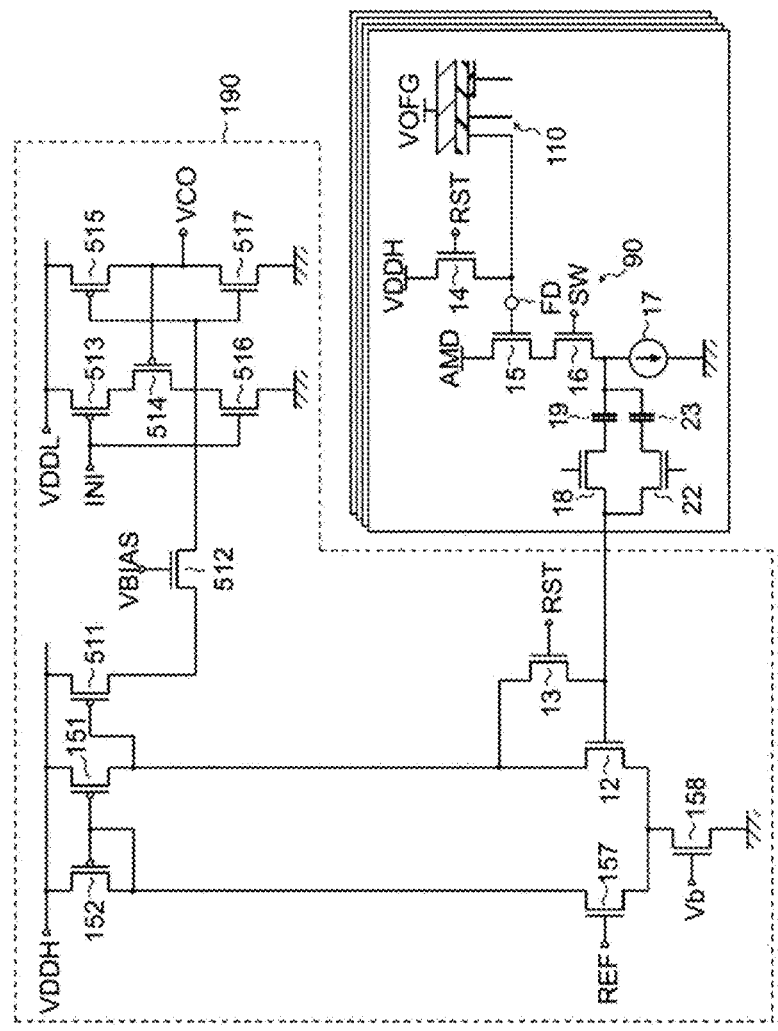
FIG. 20 is a circuit diagram of an area pixel according to a fourth example.
Figure 21:
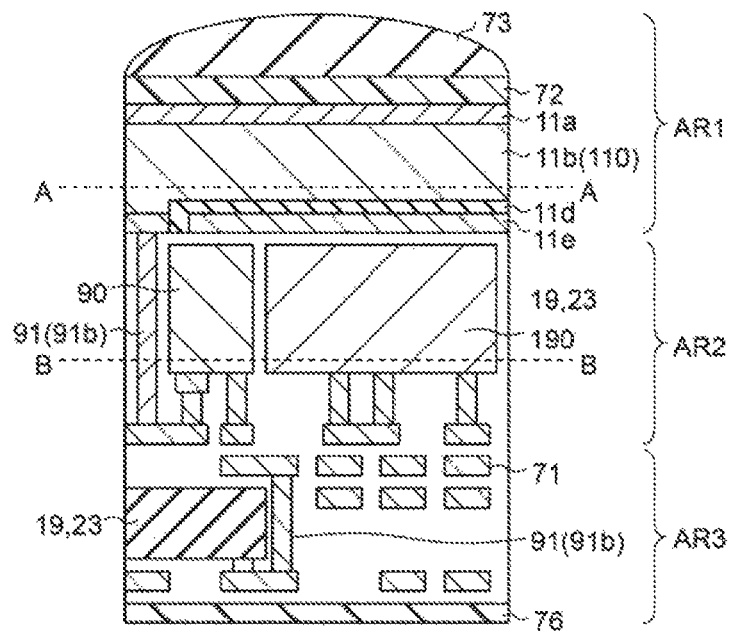
FIG. 21 is a cross-sectional view of the area pixel according to the fourth example.
Figure 22A:
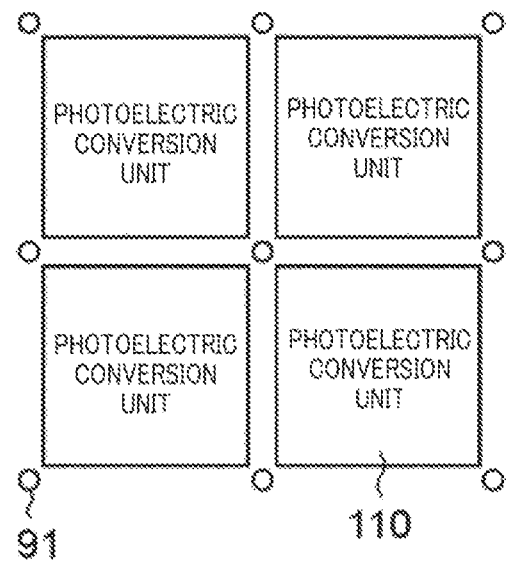
FIG. 22A is a plan view in the direction of line A-A in FIG. 21.
Figure 22B:
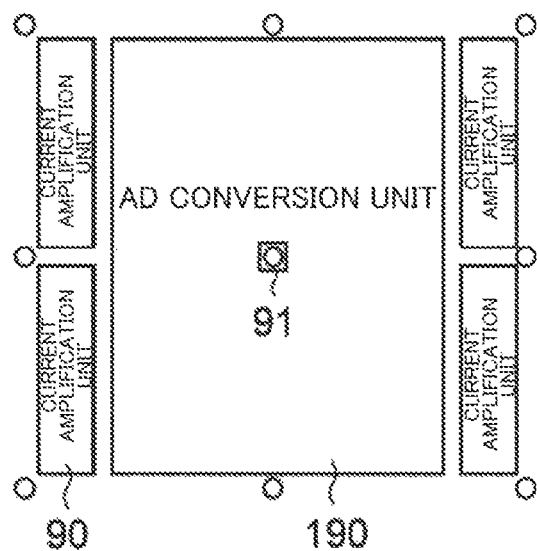
FIG. 22B is a plan view in the direction of line B-B in FIG. 21.

FIG. 20 is a circuit diagram illustrating the area pixel 100 according to a fourth example; FIG. 21 is a cross-sectional view of the area pixel 100 according to the fourth example; FIG. 22A is a plan view in the direction of line A-A in FIG. 21; and FIG. 22B is a plan view in the direction of line B-B in FIG. 21. The following will focus on the differences from the area pixel 100 according to the third example.

The circuit diagram in FIG. 20 according to the fourth example is the same as the circuit diagram in FIG. 17 according to the third example. The area pixel 100 according to the fourth example includes the first region AR1, the second region AR2, and a third region AR3, which are layered. The photoelectric conversion units 110 formed from a material other than silicon are disposed in the first region AR1. The current amplification units 90 and the AD conversion unit 190, which are formed from silicon, are disposed in the second region AR2. The storage units 19 and 23, which are formed from silicon, are disposed in the third region AR3.

The first region AR1, the second region AR2, and the third region AR3 are layered on the same substrate. The first region AR1 and the second region AR2 transmit and receive the voltage of the floating diffusion FD of the photoelectric conversion units 110 through the signal transmission unit 91, which is constituted by the via 91b, for each pixel. The second region AR2 and the third region AR3 transmit and receive the voltages across both ends of the storage units 19 and 23 through the signal transmission unit 91, which is constituted by the via 91b, for each area pixel 100.

In the fourth example, the storage units 19 and 23 are disposed in the third region AR3, which is different from the second region AR2 where the AD conversion unit 190 and the current amplification units 90 are disposed, which makes it possible to broaden the surface area for disposing the AD conversion unit 190 and the current amplification units 90.

Fifth Example of Area Pixel 100

Figure 23:
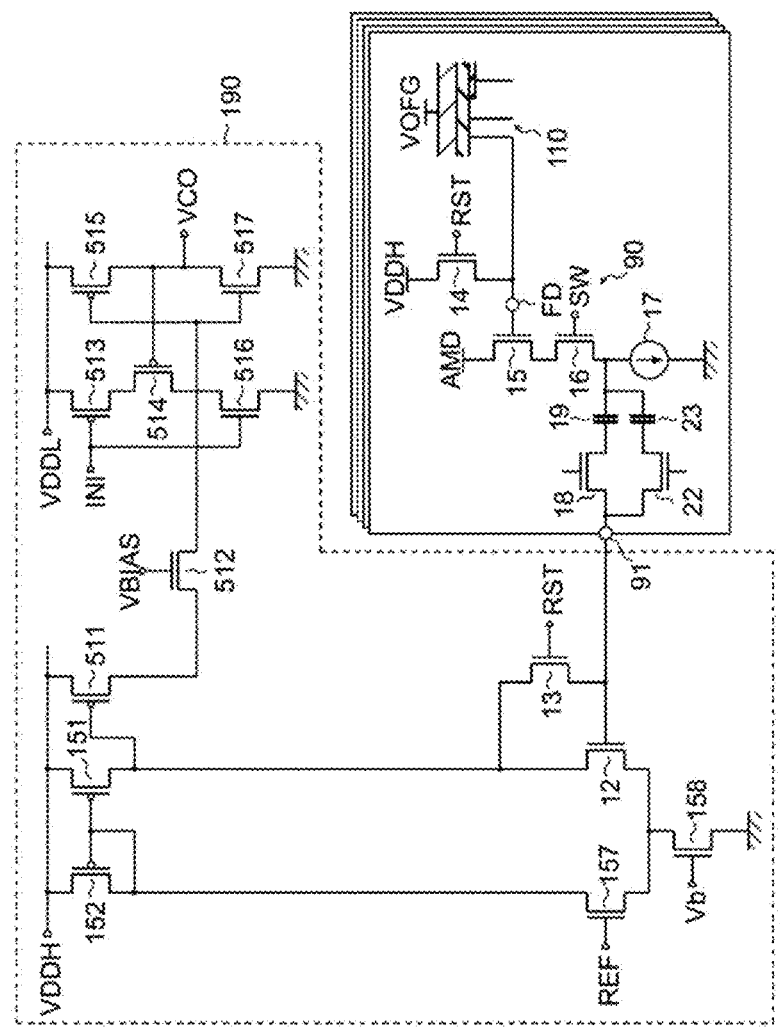
FIG. 23 is a circuit diagram of an area pixel according to a fifth example.
Figure 24:
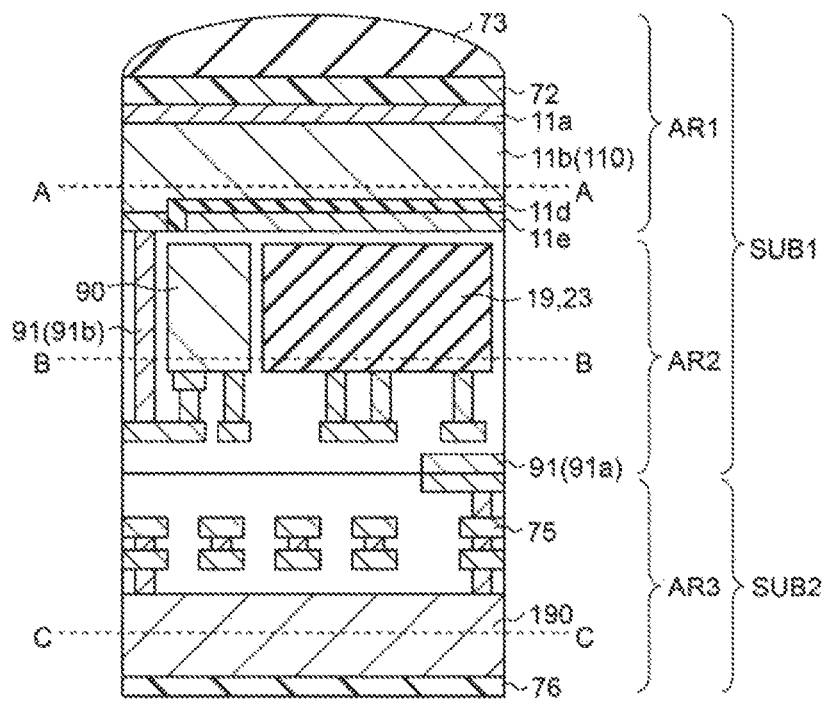
FIG. 24 is a cross-sectional view of the area pixel according to the fifth example.
Figure 25A:
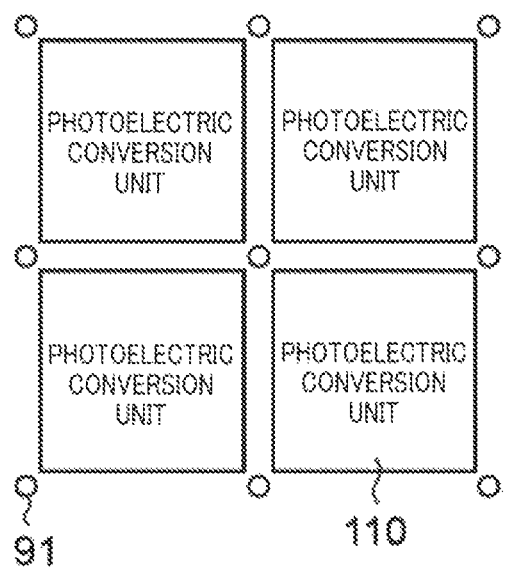
FIG. 25A is a plan view in the direction of line A-A in FIG. 24.
Figure 25B:
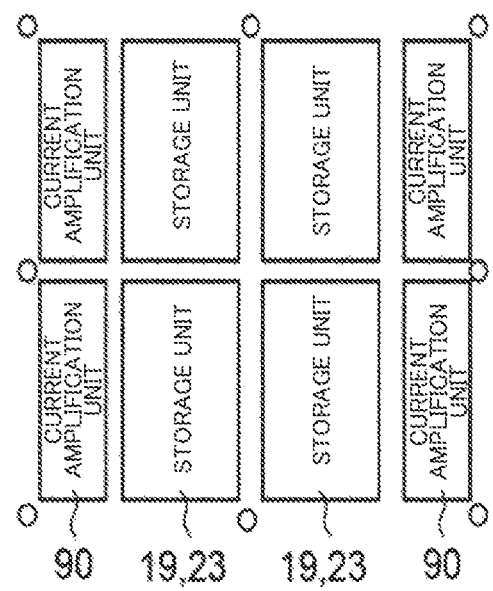
FIG. 25B is a plan view in the direction of line B-B in FIG. 24.
Figure 25C:
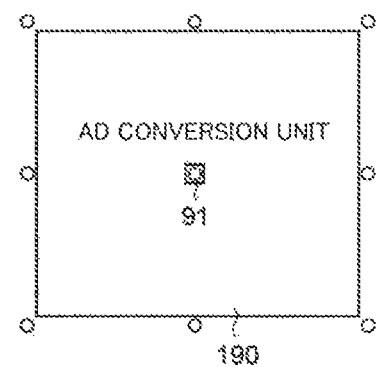
FIG. 25C is a plan view in the direction of line C-C in FIG. 24.

FIG. 23 is a circuit diagram illustrating the area pixel 100 according to a fifth example; FIG. 24 is a cross-sectional view of the area pixel 100 according to the fifth example; FIG. 25A is a plan view in the direction of line A-A in FIG. 24; FIG. 25B is a plan view in the direction of line B-B in FIG. 24; and FIG. 25C is a plan view in the direction of line C-C in FIG. 24. FIGS. 23, 24, 25A, and 25B illustrate an example of an area pixel 100 having four pixels.

Like the third example and the fourth example, the area pixel 100 according to the fifth example has the photoelectric conversion unit 110, which is formed from a material other than silicon. The layer configuration of the photoelectric conversion unit 110 is also the same as in the third example and the fourth example. The circuit diagram in FIG. 23 in the fifth example differs from the circuit diagram in FIG. 20 in the fourth example in that the signal transmission unit 91, which transmits and receives signals, is provided between the storage units 19 and 23 and the AD conversion unit 190.

As illustrated in FIG. 24, the area pixel 100 according to the fifth example includes the first region AR1, the second region AR2, and a third region AR3, which are layered. The photoelectric conversion units 110 formed from a material other than silicon are disposed in the first region AR1. The current amplification units 90 and the storage units 19 and 23, which are formed from silicon, are disposed in the second region AR2. The AD conversion unit 190, which is formed from silicon, is disposed in the third region AR3. In the second region AR2, the storage units 19 and 23 and the current amplification units 90 are provided on a pixel-by-pixel basis, whereas the AD conversion unit 190 is shared by a plurality of pixels. The first region AR1 and the second region AR2 are layered on the first substrate SUB1. The third region AR3 is layered on the second substrate SUB2.

In this manner, in the area pixel 100 according to the fifth example, the circuits disposed in the second region AR2 and the third region AR3 are different compared to the area pixels 100 according to the third example and the fourth example.

The first region AR1 and the second region AR2 transmit and receive the voltage of the floating diffusion FD of the photoelectric conversion units 110 through the signal transmission unit 91, which is constituted by the via 91b, for each pixel. The second region AR2 and the third region AR3 transmit and receive voltages according to the charges stored in the storage units 19 and 23 through the signal transmission unit 91, which is constituted by the Cu—Cu connection 91a, for each area pixel 100.

In this manner, in the area pixel 100 according to the fifth example, the AD conversion unit 190 is disposed in the third region AR3, which makes it possible to broaden the surface area for disposing the AD conversion unit 190.

Sixth Example of Area Pixel 100

Figure 26:
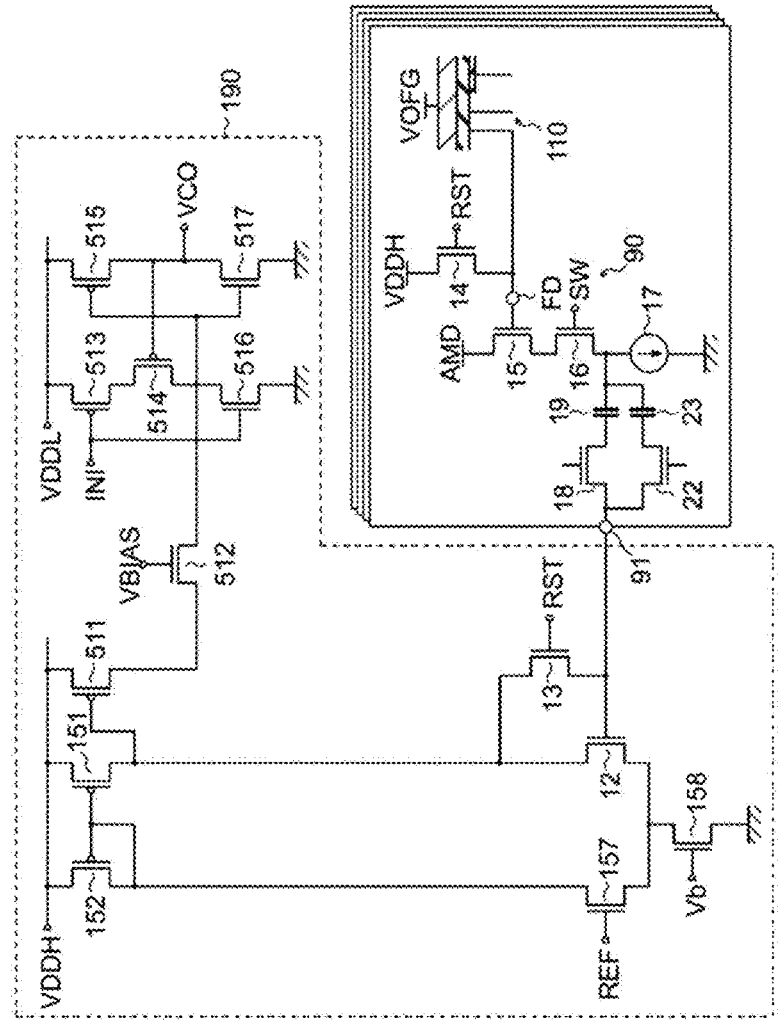
FIG. 26 is a circuit diagram of an area pixel according to a sixth example.
Figure 27:
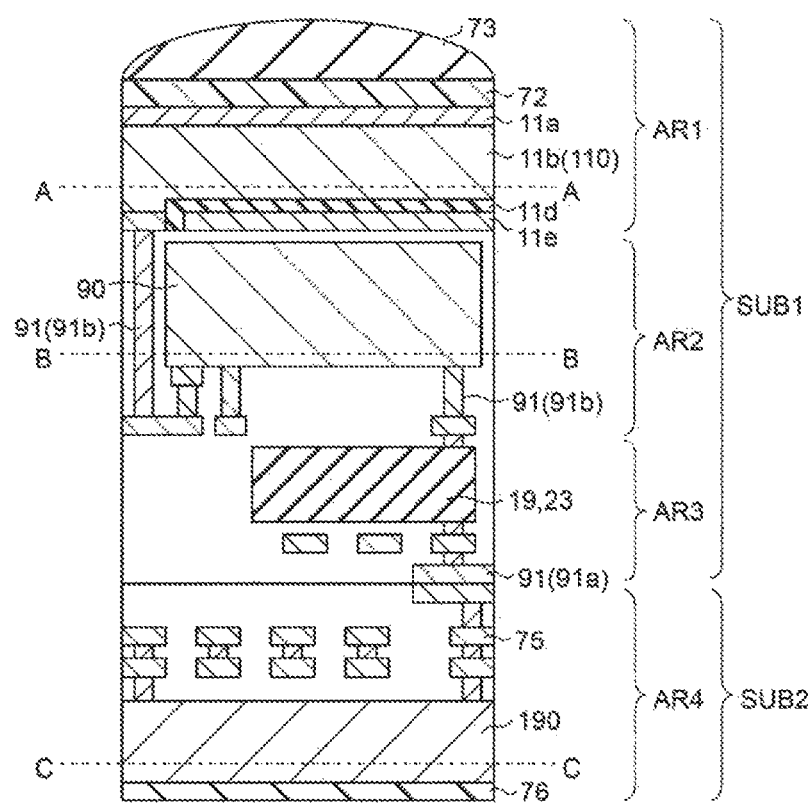
FIG. 27 is a cross-sectional view of the area pixel according to the sixth example.
Figure 28A:
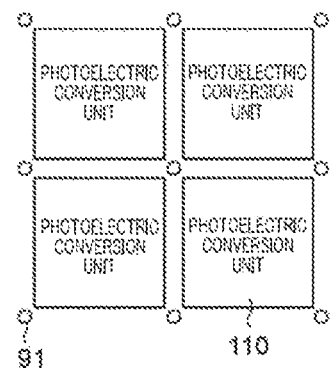
FIG. 28A is a plan view in the direction of line A-A in FIG. 27.
Figure 28B:
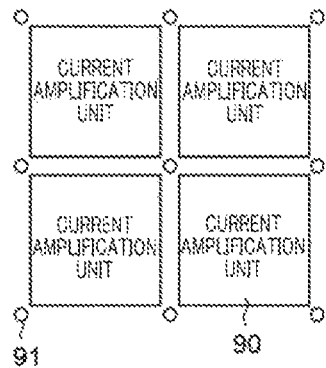
FIG. 28B is a plan view in the direction of line B-B in FIG. 27.
Figure 28C:
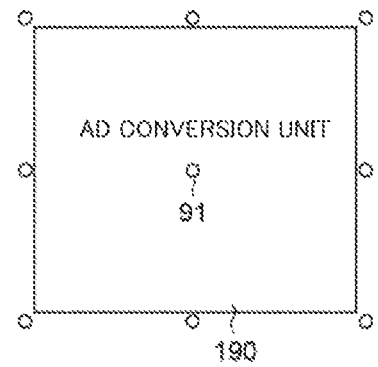
FIG. 28C is a plan view in the direction of line C-C in FIG. 27.

FIG. 26 is a circuit diagram illustrating the area pixel 100 according to a sixth example; FIG. 27 is a cross-sectional view of the area pixel 100 according to the sixth example; FIG. 28A is a plan view in the direction of line A-A in FIG. 27; FIG. 28B is a plan view in the direction of line B-B in FIG. 27; and FIG. 28C is a plan view in the direction of line C-C in FIG. 27. The following will focus on the differences from the area pixel 100 according to the fifth example.

The circuit diagram in FIG. 26 according to the sixth example is the same as the circuit in FIG. 23 according to the fifth example. The area pixel 100 according to the sixth example includes the first region AR1, the second region AR2, the third region AR3, and a fourth region AR4. The photoelectric conversion units 110 formed from a material other than silicon are disposed in the first region AR1. The current amplification units 90, which are formed from silicon, are disposed in the second region AR2. The storage units 19 and 23, which are formed from silicon, are disposed in the third region AR3. The AD conversion unit 190, which is formed from silicon, is disposed in the fourth region AR4. The first region AR1, the second region AR2, and the third region AR3 are layered on the first substrate SUB1. The fourth region AR4 is located on the second substrate SUB2.

In this manner, the area pixel 100 according to the sixth example differs from the fourth example in that the current amplification units 90 and the storage units 19 and 23 are disposed in separate regions.

The first region AR1 and the second region AR2 transmit and receive the voltage of the floating diffusion FD of the photoelectric conversion units 110 through the signal transmission unit 91, which is constituted by the via 91b, for each pixel. The second region AR2 and the third region AR3 transmit and receive the voltages at one end of the storage units 19 and 23 through the signal transmission unit 91, which is constituted by the via 91b, for each area pixel 100. The third region AR3 and the fourth region AR4 transmit and receive the voltages at the other end of the storage units 19 and 23 through the signal transmission unit 91, which is constituted by the Cu—Cu connection 91a, for each area pixel 100.

In this manner, in the area pixel 100 according to the sixth example, the current amplification units 90 and the storage units 19 and 23 are disposed in separate regions, which makes it possible to broaden the surface area for disposing the current amplification units 90 and the storage units 19 and 23.

Seventh Example of Area Pixel 100

Figure 29:
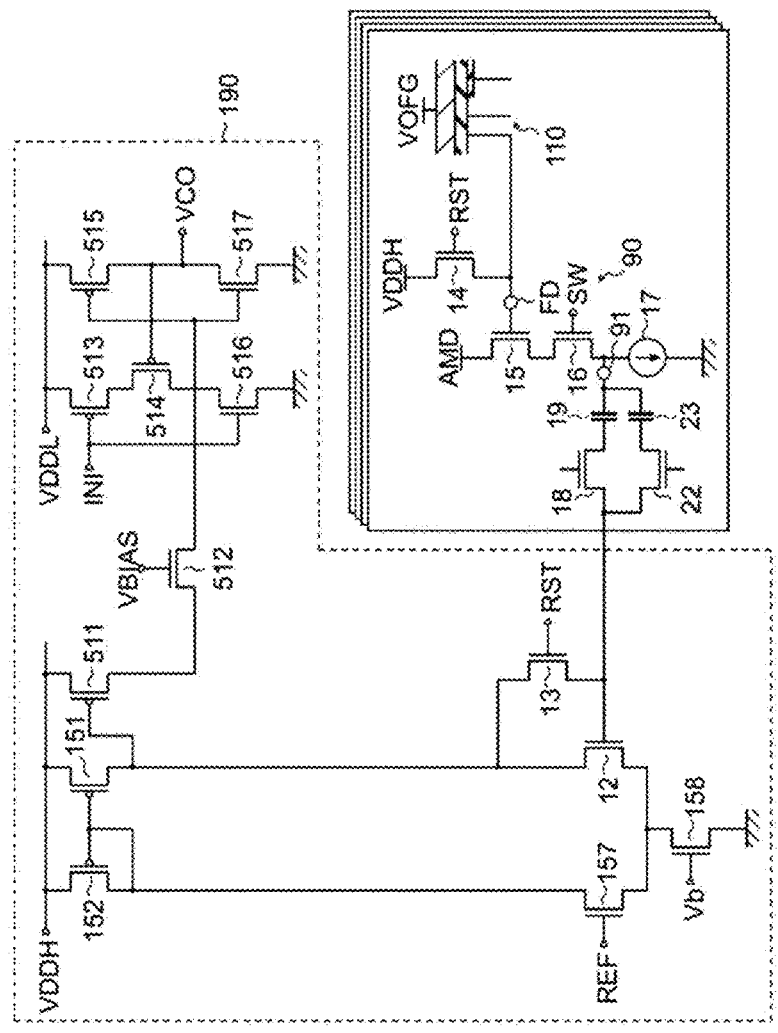
FIG. 29 is a circuit diagram of an area pixel according to a seventh example.
Figure 30:
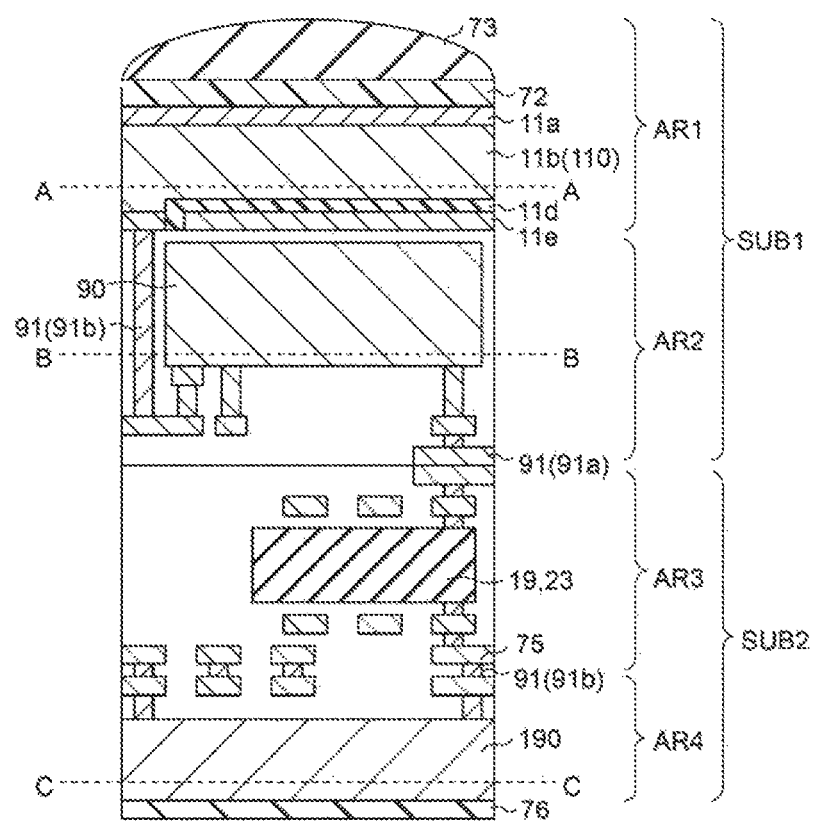
FIG. 30 is a cross-sectional view of the area pixel according to the seventh example.
Figure 31A:
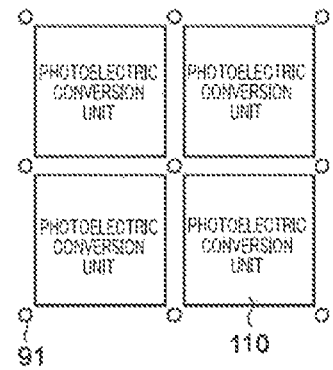
FIG. 31A is a plan view in the direction of line A-A in FIG. 30.
Figure 31B:
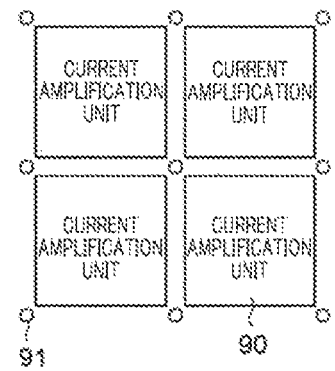
FIG. 31B is a plan view in the direction of line B-B in FIG. 30.
Figure 31C:
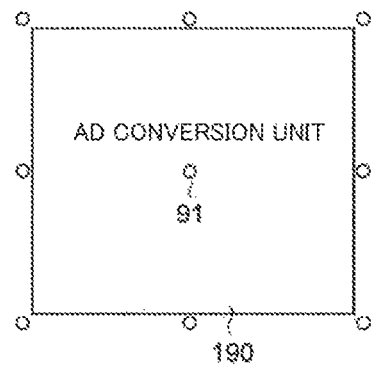
FIG. 31C is a plan view in the direction of line C-C in FIG. 30.

FIG. 29 is a circuit diagram illustrating the area pixel 100 according to a seventh example; FIG. 30 is a cross-sectional view of the area pixel 100 according to the seventh example; FIG. 31A is a plan view in the direction of line A-A in FIG. 30; FIG. 31B is a plan view in the direction of line B-B in FIG. 30; and FIG. 31C is a plan view in the direction of line C-C in FIG. 30. The following will focus on the differences from the area pixel 100 according to the sixth example.

Like the sixth example, the area pixel 100 according to the seventh example includes the first region AR1, the second region AR2, the third region AR3, and a fourth region AR4.

The circuit parts disposed in the first region AR1 to the fourth region AR4 are also similar to the sixth example, but differ from the sixth example in that signals are transmitted and received between the current amplification units 90 and the storage units 19 and 23 through the signal transmission unit 91.

The area pixel 100 according to the seventh example has a different substrate configuration from that in the sixth example. The area pixel 100 according to the seventh example includes the first substrate SUB1, on which the first region AR1 and the second region AR2 are layered, and the second substrate SUB2, on which the third region AR3 and the fourth region AR4 are layered.

The first region AR1 and the second region AR2 transmit and receive the voltage of the floating diffusion FD of the photoelectric conversion units 110 through the signal transmission unit 91, which is constituted by the via 91b, for each pixel. The second region AR2 and the third region AR3 transmit and receive the voltages at one end of the storage units 19 and 23 through the signal transmission unit 91, which is constituted by the Cu—Cu connection 91a, for each pixel. The third region AR3 and the fourth region AR4 transmit and receive the voltages at the other end of the storage units 19 and 23 through the signal transmission unit 91, which is constituted by the via 91b, for each area pixel 100.

Eighth Example of Area Pixel 100

Figure 32:
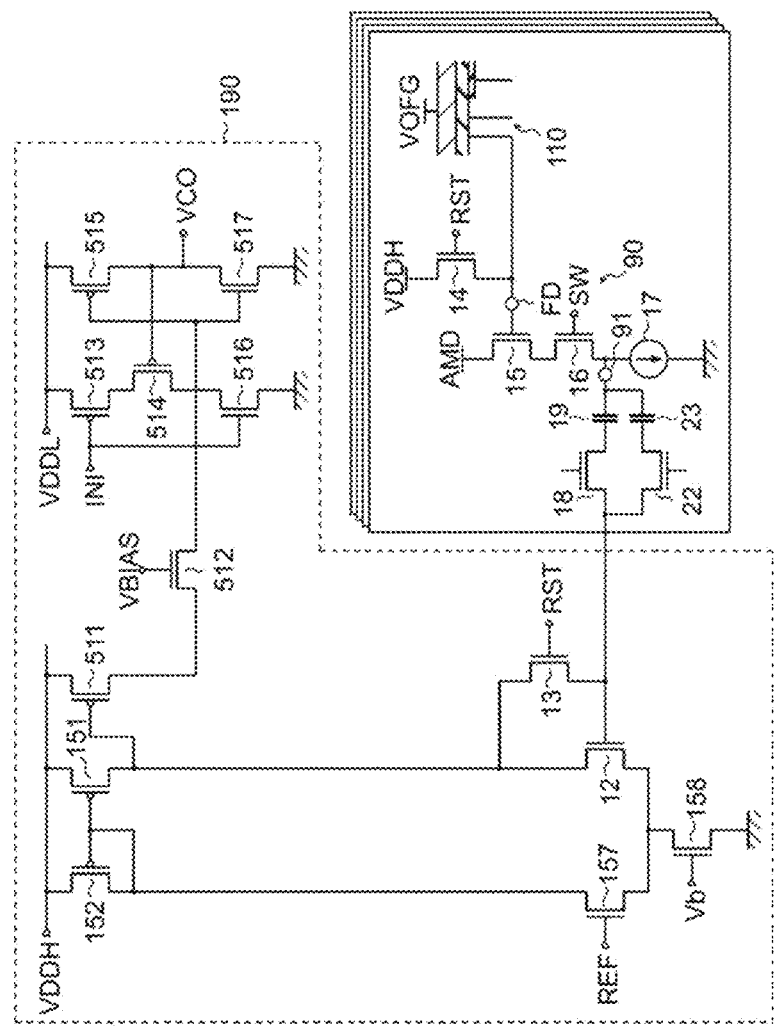
FIG. 32 is a circuit diagram of an area pixel according to an eighth example.
Figure 33:
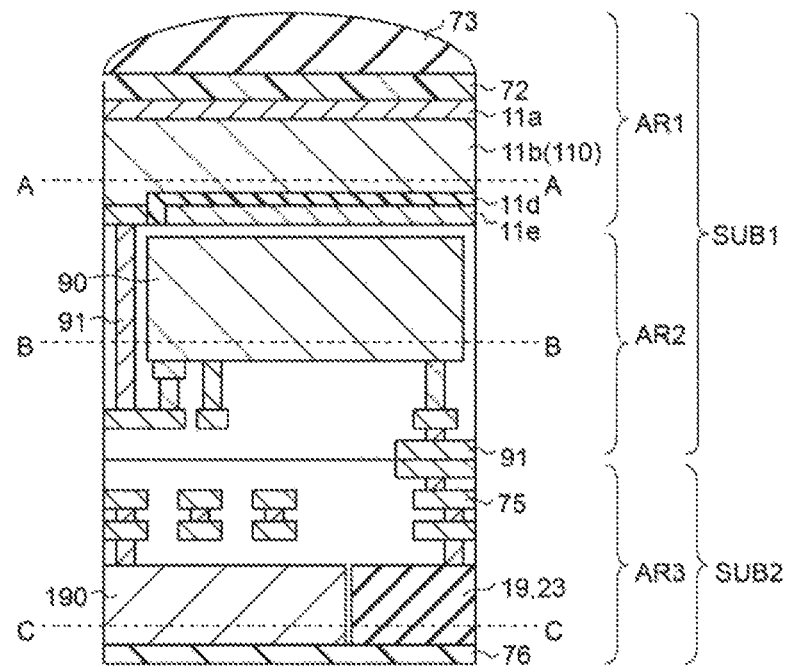
FIG. 33 is a cross-sectional view of the area pixel according to the eighth example.
Figure 34A:
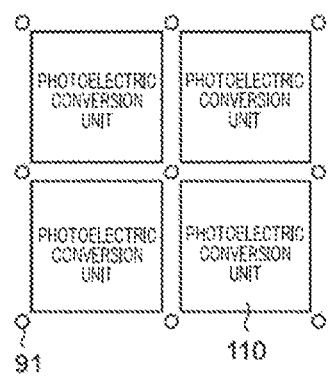
FIG. 34A is a plan view in the direction of line A-A in FIG. 33.
Figure 34B:
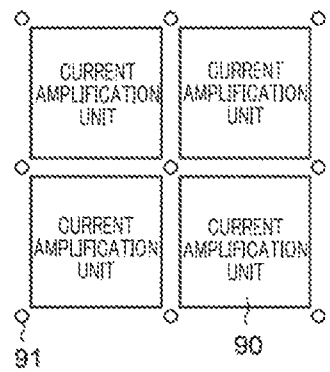
FIG. 34B is a plan view in the direction of line B-B in FIG. 33.
Figure 34C:
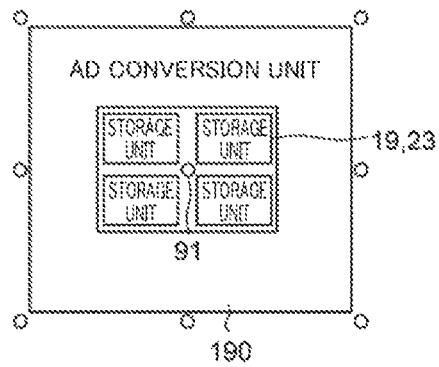
FIG. 34C is a plan view in the direction of line C-C in FIG. 33.

FIG. 32 is a circuit diagram illustrating the area pixel 100 according to an eighth example; FIG. 33 is a cross-sectional view of the area pixel 100 according to the eighth example; FIG. 34A is a plan view in the direction of line A-A in FIG. 33; FIG. 34B is a plan view in the direction of line B-B in FIG. 33; and FIG. 34C is a plan view in the direction of line C-C in FIG. 33. The following will focus on the differences from the area pixel 100 according to the seventh example.

The circuit diagram in FIG. 32 according to the eighth example is the same as the circuit diagram in FIG. 29 according to the seventh example. The area pixel 100 according to the eighth example includes the first region AR1, the second region AR2, and the third region AR3. The photoelectric conversion units 110 formed from a material other than silicon are disposed in the first region AR1. The current amplification units 90, which are formed from silicon, are disposed in the second region AR2. The storage units 19 and 23 and the AD conversion unit 190, which are formed from silicon, are disposed in the third region AR3. The first region AR1 and the second region AR2 are layered on the first substrate SUB1, and the third region AR3 is located on the second substrate SUB2. The first region AR1 and the second region AR2 transmit and receive the voltage of the floating diffusion FD of the photoelectric conversion units 110 through the signal transmission unit 91, which is constituted by a via, for each pixel. The second region AR2 and the third region AR3 transmit and receive the voltages at one end of the storage units 19 and 23 through the signal transmission unit 91, which is constituted by a Cu—Cu connection.

The area pixels 100 according to the eighth example differs from that in the seventh example in that the storage units 19 and 23 and the AD conversion unit 190 are both disposed in the third region AR3. This reduces the number of regions and simplifies the manufacturing process compared to the seventh example.

(Summary of First to Eighth Examples of Area Pixel 100)

The area pixel 100 according to the present disclosure includes a plurality of pixels. The area pixels 100 includes the plurality of photoelectric conversion units 110, the plurality of floating diffusions FD, the plurality of current amplification units 90, and the AD conversion unit 190. Each floating diffusion FD outputs a voltage according to a charge obtained from photoelectric conversion by the photoelectric conversion unit 110 within the corresponding pixel. The AD conversion unit 190 is provided for each area pixel 100 constituted by two or more pixels among the plurality of pixels in the area pixel 100, and converts the signals stored in the two or more storage units 19 and 23 corresponding to the two or more pixels within the area pixel 100 into digital signals.

The plurality of photoelectric conversion units 110, the plurality of AD converters 190, the plurality of floating diffusions FD, the plurality of current amplification units 90, and the plurality of storage units 19 and 23 in the plurality of pixels are disposed in a plurality of layered regions. The signal transmission unit 91 transmits and receives signals between the plurality of regions. Of the plurality of regions, the region in which the plurality of photoelectric conversion units 110 are disposed is provided separate from the region in which the plurality of current amplification units 90 are disposed. The region in which the plurality of photoelectric conversion units 110 are disposed and the region in which the plurality of current amplification units 90 are disposed in the area pixel 100 transmit and receive the voltages of the plurality of floating diffusions FD through the corresponding signal transmission unit 91.

The area pixels 100 according to the first example to the eighth example have the storage unit 19 for P-phase signals and the storage unit 23 for D-phase signals provided separately. The circuit configurations of the photoelectric conversion units 110, the current amplification units 90, and the storage units 19 and 23 for implementing a global shutter are not limited to those described above. Other representative circuit configurations for the photoelectric conversion units 110, the current amplification units 90, and the storage units 19 and 23 for implementing a global shutter will be described below.

(First Variation on Photoelectric Conversion Unit 110, Current Amplification Unit 90, and Storage Units 19 and 23)

Figure 35A:
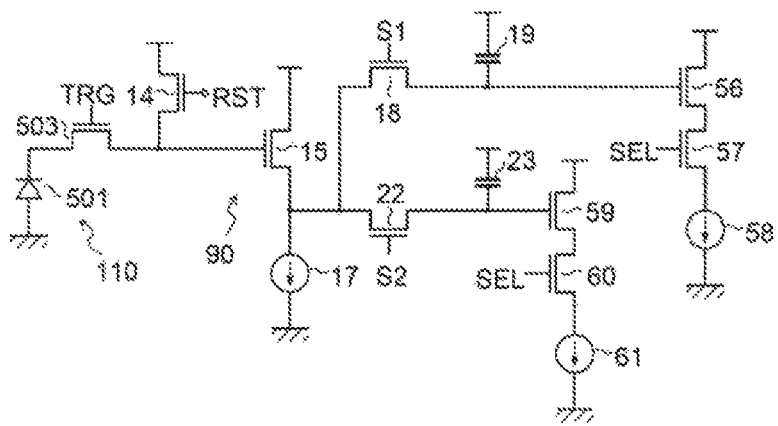
FIG. 35A is a circuit diagram illustrating a photoelectric conversion unit, a current amplification unit, and a storage unit according to a first variation.

FIG. 35A is a circuit diagram illustrating the photoelectric conversion unit 110, the current amplification unit 90, and storage units 19 and 23 according to a first variation. The photoelectric conversion unit 110 illustrated in FIG. 35A has the photodiode 501 and the transistor 503. The current amplification unit 90 illustrated in FIG. 35A has transistors 14, 15, 18, 22, 56, 57, 59, and 60, and current sources 17, 58, and 61. The transistor 18 controls whether to store a P-phase signal in the storage unit 19. The transistor 22 controls whether to store a D-phase signal in the storage unit 23.

Figure 35B:
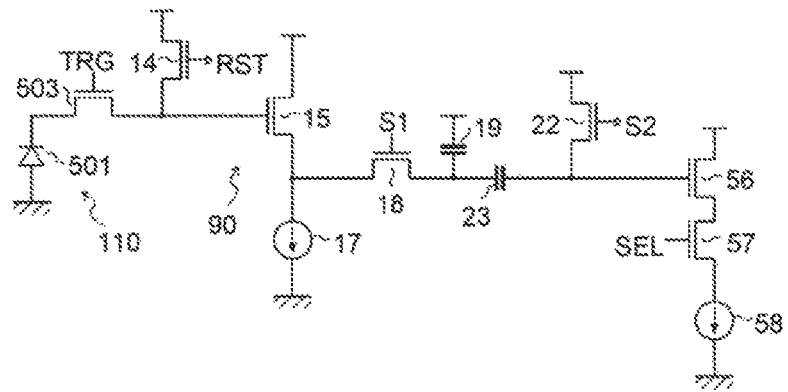
FIG. 35B is a circuit diagram illustrating a photoelectric conversion unit, a current amplification unit, and a storage unit according to a second variation.

FIG. 35B is a circuit diagram illustrating the photoelectric conversion unit 110, the current amplification unit 90, and storage units 19 and 23 according to a second variation. The photoelectric conversion unit 110 illustrated in FIG. 35B has the photodiode 501 and the transistor 503. The current amplification unit 90 illustrated in FIG. 35B has transistors 14, 15, 18, 22, 56, and 57 and current sources 17 and 58. The storage unit 23 stores a signal corresponding to the difference between the P-phase signal and the D-phase signal.

Figure 35C:
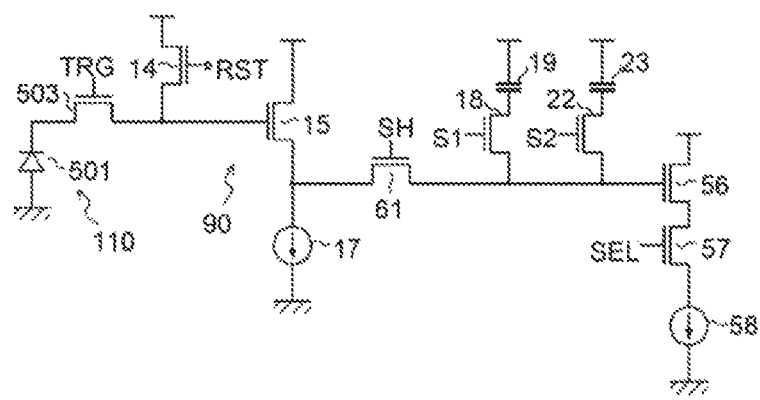
FIG. 35C is a circuit diagram illustrating a photoelectric conversion unit, a current amplification unit, and a storage unit according to a third variation.

FIG. 35C is a circuit diagram illustrating the photoelectric conversion unit 110, the current amplification unit 90, and storage units 19 and 23 according to a third variation. The photoelectric conversion unit 110 illustrated in FIG. 35C has the photodiode 501 and the transistor 503. The current amplification unit 90 illustrated in FIG. 35C has transistors 14, 15, 18, 22, 56, and 57 and current sources 17 and 58. The transistor 18 controls whether to store a P-phase signal in a capacitor 19. The transistor 22 controls whether to store a D-phase signal in a capacitor 23.

Figure 35D:
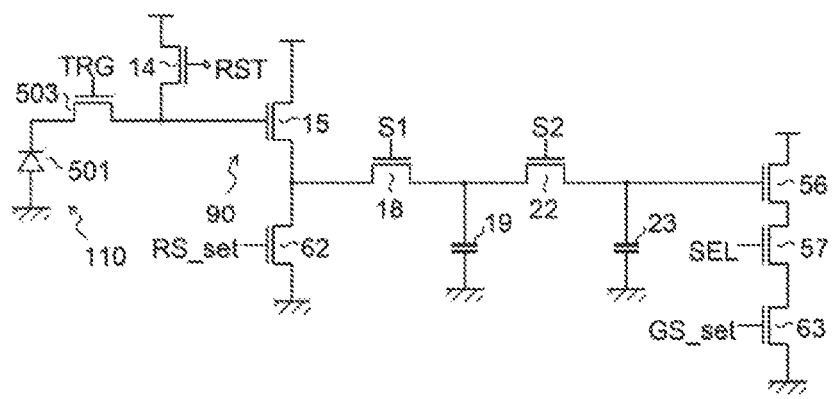
FIG. 35D is a circuit diagram illustrating a photoelectric conversion unit, a current amplification unit, and a storage unit according to a fourth variation.

FIG. 35D is a circuit diagram illustrating the photoelectric conversion unit 110, the current amplification unit 90, and storage units 19 and 23 according to a fourth variation. The circuit diagram in FIG. 35D illustrates a function for selecting between a global shutter method and a rolling shutter method. The photoelectric conversion unit 110 illustrated in FIG. 35D has the photodiode 501 and the transistor 503. The current amplification unit 90 illustrated in FIG. 35D has transistors 14, 15, 18, 22, 56, and 57.

When the rolling shutter method is selected, a transistor 62 is turned on and a transistor 63 is turned off. This causes the source voltage of the transistor 62 to change according to the voltage of the floating diffusion FD.

When the global shutter method is selected, the transistor 63 is turned on and the transistor 62 is turned off. This causes the source voltage of the transistor 63 to change according to the voltages of the capacitor 19, which stores the P-phase signal, and the capacitor 23, which stores the D-phase signal.

<Example of Application in Moving Body>

The technique according to the present disclosure (the present technique) can be applied in various products. For example, the technique according to the present disclosure may be realized as a device mounted on any type of moving body such as an automobile, an electric automobile, a hybrid electric automobile, a motorcycle, a bicycle, a personal mobility device, an airplane, a drone, a ship, a robot, or the like.

Figure 36:
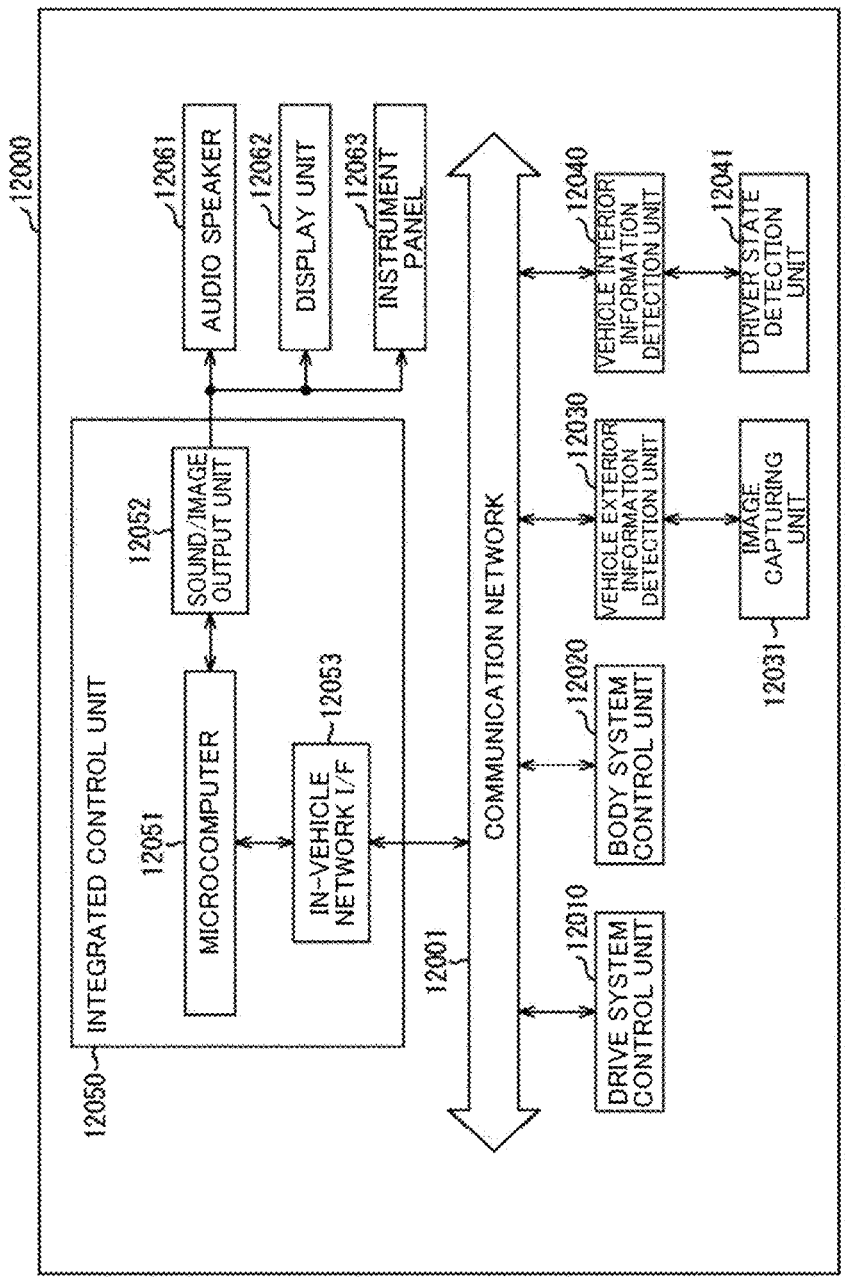
FIG. 36 is a block diagram illustrating an example of the overall configuration of a vehicle control system.

FIG. 36 is a block diagram schematically illustrating an example of the configuration example of a vehicle control system, which is an example of a moving body control system to which the technique according to the present disclosure can be applied.

A vehicle control system 12000 includes a plurality of electronic control units connected to each other over a communication network 12001. In the example illustrated in FIG. 36, the vehicle control system 12000 includes a drive system control unit 12010, a body system control unit 12020, a vehicle exterior information detection unit 12030, a vehicle interior information detection unit 12040, and an integrated control unit 12050. A microcomputer 12051, a sound/image output unit 12052, and an in-vehicle network I/F (interface) 12053 are illustrated as the functional configuration of the integrated control unit 12050.

The drive system control unit 12010 controls operations of devices related to a drive system of the vehicle in accordance with various programs. For example, the drive system control unit 12010 functions as control devices, such as a driving force generation device for generating driving force for the vehicle, such as an internal combustion engine or a driving motor; a driving force transmission mechanism for transmitting driving force to wheels; a steering mechanism for adjusting a turning angle of the vehicle; a braking device that generates braking force for the vehicle; and the like.

The body system control unit 12020 controls the operations of various devices mounted in the vehicle body in accordance with various programs. For example, the body system control unit 12020 functions as control devices for a keyless entry system, a smart key system, power window devices, or various lamps such as headlights, backup lights, brake lights, turn signals, fog lights, and the like. In this case, radio waves emitted from a portable device that substitutes for a key or signals from various switches can be input to the body system control unit 12020. The body system control unit 12020 receives the input of the radio waves or signals and controls door lock devices, power window devices, the lamps, and the like of the vehicle.

The vehicle exterior information detection unit 12030 detects information on the exterior of the vehicle in which the vehicle control system 12000 is installed. For example, an image capturing unit 12031 is connected to the vehicle exterior information detection unit 12030. The vehicle exterior information detection unit 12030 causes the image capturing unit 12031 to capture an image of the exterior of the vehicle, and receives the captured image. The vehicle exterior information detection unit 12030 may perform object detection processing or distance detection processing for peoples, cars, obstacles, signs, letters on the road, and the like based on the received image.

The image capturing unit 12031 is an optical sensor that receives light and outputs an electrical signal according to the intensity of the received light. The image capturing unit 12031 can also output the electrical signal as an image or as distance measurement information. In addition, the light received by the image capturing unit 12031 may be visible light or non-visible light such as infrared light.

The vehicle interior information detection unit 12040 detects information on the interior of the vehicle. For example, a driver state detection unit 12041 that detects a state of a driver is connected to the vehicle interior information detection unit 12040. The driver state detection unit 12041 includes, for example, a camera that captures an image of the driver, and the vehicle interior information detection unit 12040 may calculate the level of the driver's fatigue or concentration, or may determine whether the driver is dozing, based on detection information input from the driver state detection unit 12041.

The microcomputer 12051 can calculate control target values for the driving force generation device, the steering mechanism, or the braking device based on the information on the interior and exterior of the vehicle obtained by the vehicle exterior information detection unit 12030 or the vehicle interior information detection unit 12040, and output control commands to the drive system control unit 12010. For example, the microcomputer 12051 can perform coordinated control for the purpose of implementing functions of an advanced driver assistance system (ADAS) including vehicle collision avoidance, impact mitigation, following traveling based on an inter-vehicle distance, constant vehicle speed driving, vehicle collision warnings, and lane departure warning.

Further, the microcomputer 12051 can perform coordinated control for the purpose of automated driving or the like in which autonomous travel is performed without requiring operations of the driver, by controlling the driving force generation device, the steering mechanism, the braking device, or the like based on information about the surroundings of the vehicle, the information being obtained by the vehicle exterior information detection unit 12030 or the vehicle interior information detection unit 12040.

In addition, the microcomputer 12051 can output control commands to the body system control unit 12030 based on the information on the exterior of the vehicle obtained by the vehicle exterior information detection unit 12030. For example, the microcomputer 12051 can perform coordinated control for the purpose of suppressing glare, such as switching from high beams to low beams by controlling the headlights according to the position of a preceding vehicle or an oncoming vehicle detected by the vehicle exterior information detection unit 12030.

The sound/image output unit 12052 transmits an output signal of at least one of sound and an image to an output device capable of visually or audibly providing information to an occupant or to the exterior of the vehicle. In the example illustrated in FIG. 36, an audio speaker 12061, a display unit 12062, and an instrument panel 12063 are illustrated as examples of the output device. The display unit 12062 may include at least one of an on-board display and a heads-up display, for example.

Figure 37:
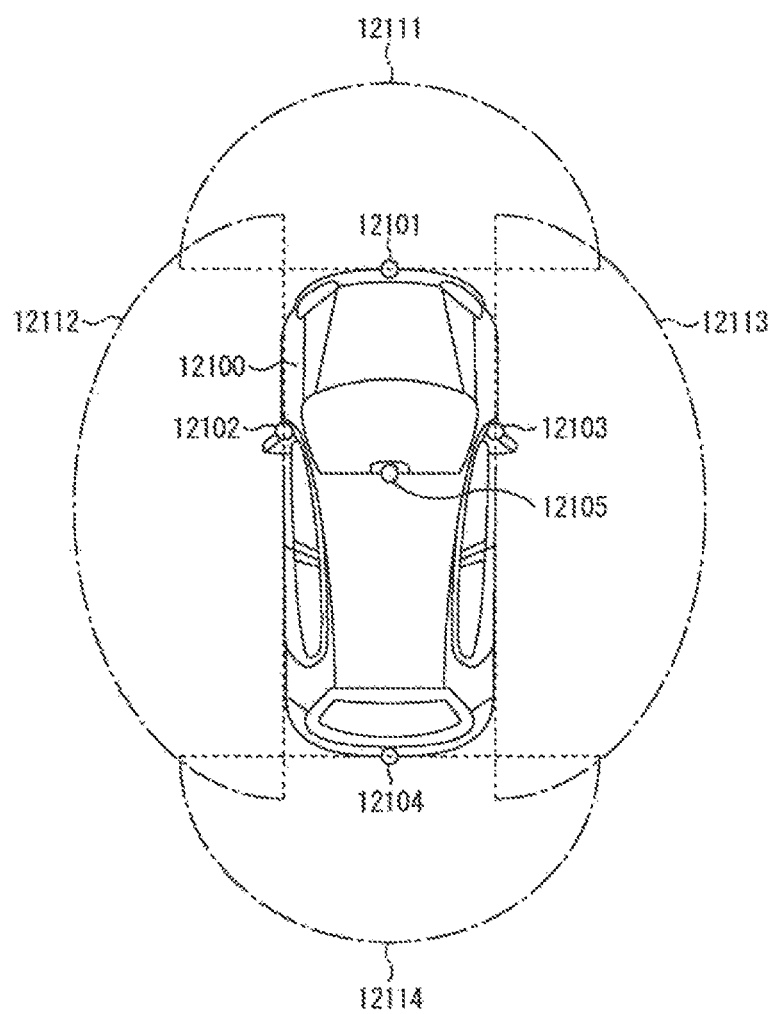
FIG. 37 is an explanatory diagram illustrating an example of positions at which a vehicle exterior information detection unit and an image capturing unit are installed.

FIG. 37 is a diagram illustrating an example of an installation position of the image capturing unit 12031.

In FIG. 37, the image capturing unit 12031 includes image capturing units 12101, 12102, 12103, 12104, and 12105.

The image capturing units 12101, 12102, 12103, 12104, and 12105 are provided at the positions of the front nose, the side-view mirrors, the rear bumper, the trunk door, an upper part of the windshield within the vehicle cabin, and the like of a vehicle 12100, for example. The image capturing unit 12101 provided on the front nose and the image capturing unit 12105 provided in an upper part of the windshield within the vehicle cabin mainly obtain images from in front of the vehicle 12100. The image capturing units 12102 and 12103 provided in the side-view mirrors mainly obtain images from the sides of the vehicle 12100. The image capturing unit 12104 provided on the rear bumper or the trunk door mainly obtains image of an area behind the vehicle 12100. The image capturing unit 12105 provided on an upper part of the windshield within the vehicle cabin is mainly used for detecting preceding vehicles, pedestrians, obstacles, traffic signals, traffic signs, lanes, and the like.

FIG. 37 illustrates an example of image capturing ranges of the image capturing units 12101 to 12104. An image capturing range 12111 indicates an image capturing range of the image capturing unit 12101 provided on the front nose; image capturing ranges 12112 and 12113 respectively indicate the image capturing ranges of the image capturing units 12102 and 12103 provided in the side-view mirrors; and an image capturing range 12114 indicates the image capturing range of the image capturing unit 12104 provided on the rear bumper or the trunk door. For example, by superimposing image data captured by the image capturing units 12101 to 12104, it is possible to obtain a bird's-eye view image seen from above the vehicle 12100.

At least one of the image capturing units 12101 to 12104 may have a function for obtaining distance information. For example, at least one of the image capturing units 12101 to 12104 may be a stereo camera constituted by a plurality of image sensors, or may be an image sensor that has pixels for phase difference detection.

For example, the microcomputer 12051 can extract, particularly, a closest three-dimensional object on a path through which the vehicle 12100 is traveling, which is a three-dimensional object traveling at a predetermined speed (for example, 0 km/h or higher) in the substantially same direction as the vehicle 12100, as a preceding vehicle by obtaining a distance to each three-dimensional object in the image capturing ranges 12111 to 12114 and temporal change in the distance (a relative speed with respect to the vehicle 12100) based on distance information obtained from the image capturing units 12101 to 12104. The microcomputer 12051 can also set a following distance to the preceding vehicle to be maintained in advance and perform automatic brake control (including following stop control) and automatic acceleration control (including following start control). It is therefore possible to perform coordinated control for the purpose of, for example, automated driving in which the vehicle travels in an automated manner without requiring the driver to perform operations.

For example, the microcomputer 12051 can classify and extract three-dimensional data regarding three-dimensional objects as two-wheeled vehicles, normal vehicles, large vehicles, pedestrians, and other three-dimensional objects such as electrical poles based on the distance information obtained from the image capturing units 12101 to 12104, and can use the three-dimensional data to automatically avoid obstacles. For example, the microcomputer 12051 classifies obstacles around the vehicle 12100 into obstacles visible to the driver of the vehicle 12100 and obstacles which are difficult to see. Then, the microcomputer 12051 determines a collision risk indicating the degree of risk of collision with each obstacle, and when the collision risk is at least a set value and there is a possibility of collision, an alarm is output to the driver through the audio speaker 12061 or the display unit 12062, forced deceleration or avoidance steering is performed through the drive system control unit 12010, and the like, making it possible to provide driving assistance for collision avoidance.

At least one of the image capturing units 12101 to 12104 may be an infrared camera that detects infrared rays. For example, the microcomputer 12051 can recognize a pedestrian by determining whether there is a pedestrian in an image captured by the image capturing units 12101 to 12104. Such pedestrian recognition is performed by, for example, a procedure in which feature points in the images captured by the image capturing units 12101 to 12104 as infrared cameras are extracted and a procedure in which pattern matching processing is performed on a series of feature points indicating an outline of an object to determine whether the object is a pedestrian. When the microcomputer 12051 determines that there is a pedestrian in the image captured by the image capturing units 12101 to 12104 and the pedestrian is recognized, the sound/image output unit 12052 controls the display unit 12062 such that a square contour line for emphasis is superimposed on and displayed with the recognized pedestrian. In addition, the sound/image output unit 12052 may control the display unit 12062 such that an icon indicating a pedestrian or the like is displayed at a desired position.

An example of the vehicle control system to which the technique according to the present disclosure can be applied has been described thus far. The technique according to the present disclosure may be applied to the image capturing unit 12031 and the like among the above-described configurations. Specifically, the image capturing apparatus 1 of the present disclosure can be applied to the image capturing unit 12031. By applying the technique according to the present disclosure to the image capturing unit 12031, a clearer captured image can be obtained, which makes it possible to reduce driver fatigue.

Note that the present technique can also take on the following configurations.

(1) An image capturing apparatus including:
  a plurality of pixels each having a photoelectric conversion unit;
  a floating diffusion that outputs a voltage according to a charge obtained from photoelectric conversion by the photoelectric conversion unit in the pixel;
  a current amplification unit that amplifies a current according to the voltage of the floating diffusion;
  a storage unit that stores a signal according to the current amplified by the current amplification unit;

an analog-digital converter, provided for each of area pixels constituted by two or more of the pixels among the plurality of pixels, that converts the signals stored in two or more of the storage units corresponding to the two or more pixels in the area pixel into digital signals;

a plurality of regions which are layered and in which a plurality of the photoelectric conversion units in the plurality of pixels, a plurality of the analog-digital converters, a plurality of the floating diffusions, a plurality of the current amplification units, and a plurality of the storage units are disposed; and a signal transmission unit that transmits and receives signals between the plurality of regions, wherein of the plurality of regions, a region in which the plurality of photoelectric conversion units are disposed is provided separate from a region in which the plurality of current amplification units are disposed, and the region in which the plurality of photoelectric conversion units are disposed in the area pixel and the region in which the plurality of current amplification units are disposed in the area pixel transmit and receive the voltages of the plurality of floating diffusions through corresponding ones of the signal transmission units.

(2) The image capturing apparatus according to (1), wherein the plurality of current amplification units, the plurality of storage units, and the plurality of analog-digital converters are disposed in a same region among the plurality of regions.

(3) The image capturing apparatus according to (2), wherein the plurality of current amplification units, the plurality of storage units, and the plurality of analog-digital converters are disposed in a same layer in the same region.

(4) The image capturing apparatus according to (3), wherein two or more of the current amplification units and two or more of the storage units belonging to a same area pixel are disposed symmetrically along respective opposing sides of a corresponding one of the analog-digital converters.

(5) The image capturing apparatus according to (2), wherein the plurality of current amplification units, the plurality of analog-digital converters, and the plurality of storage units are disposed in mutually different layers in the same region.

(6) The image capturing apparatus according to (5), wherein the plurality of storage units are disposed in a wiring layer in the same region.

(7) The image capturing apparatus according to any one of (1) to (6), including:
a first region in which the plurality of photoelectric conversion units are disposed; and
a second region in which the plurality of current amplification units, the plurality of storage units, and the plurality of analog-digital converters are disposed, wherein the first region and the second region transmit and receive the voltages of the plurality of floating diffusions through mutually different ones of the signal transmission units, for each of the pixels.

(8) The image capturing apparatus according to (7), including:
a first substrate having the first region; and
a second substrate having the second region,
wherein the first substrate and the second substrate transmit and receive the voltages of the floating diffusions through mutually different ones of the signal transmission units, for each of the pixels.

(9) The image capturing apparatus according to (1), wherein the plurality of photoelectric conversion units, the plurality of current amplification units and the plurality of storage units, and the plurality of analog-digital converters are disposed in mutually different ones of the plurality of regions.

(10) The image capturing apparatus according to (9), wherein the plurality of regions include:
a first region in which the plurality of photoelectric conversion units are disposed;
a second region in which the plurality of current amplification units and the plurality of storage units are disposed; and
a third region in which the plurality of analog-digital converters are disposed, wherein the first region and the second region transmit and receive the voltages of the plurality of floating diffusions through mutually different ones of the signal transmission units, for each of the pixels.

(11) The image capturing apparatus according to (10), wherein the plurality of current amplification units and the plurality of storage units are disposed in a same layer in the second region.

(12) The image capturing apparatus according to (10) or (11), including:
a first substrate on which the first region and the second region are layered; and a second substrate having the third region,
wherein the first substrate and the second substrate transmit and receive the signals stored in the plurality of storage units through mutually different ones of the signal transmission units, for each of the pixels.

(13) The image capturing apparatus according to (1), wherein the plurality of photoelectric conversion units, the plurality of current amplification units, the plurality of storage units, and the plurality of analog-digital converters are disposed in mutually different ones of the plurality of regions.

(14) The image capturing apparatus according to (13), wherein the plurality of regions include:
a first region in which the plurality of photoelectric conversion units are disposed;
a second region in which the plurality of current amplification units are disposed;
a third region in which the plurality of storage units are disposed; and
a fourth region in which the plurality of analog-digital converters are disposed, wherein the first region and the second region transmit and receive the voltages of the plurality of floating diffusions through mutually different ones of the signal transmission units, for each of the pixels.

(15) The image capturing apparatus according to (14), including:
a first substrate on which the first region, the second region, and the third region are layered; and
a second substrate having the fourth region,
wherein the first substrate and the second substrate transmit and receive the signals stored in the plurality of storage units through mutually different ones of the signal transmission units, for each of the pixels.

(16) The image capturing apparatus according to (15), including:
a first substrate on which the first region and the second region are layered; and
a second substrate having the third region and the fourth region, wherein the first substrate and the second substrate transmit and receive the current amplified by the plurality of current amplification units through mutually different ones of the signal transmission units, for each of the pixels.

(17) The image capturing apparatus according to (1), wherein the plurality of photoelectric conversion units, the plurality of current amplification units, and the plurality of storage units and the plurality of analog-digital converters are disposed in mutually different ones of the plurality of regions.

(18) The image capturing apparatus according to (17), wherein the plurality of regions include:
a first region in which the plurality of photoelectric conversion units are disposed;
a second region in which the plurality of current amplification units are disposed; and
a third region in which the plurality of storage units and the plurality of analog-digital converters are disposed,
wherein the first region and the second region transmit and receive the voltages of the plurality of floating diffusions through mutually different ones of the signal transmission units, for each of the pixels.

(19) The image capturing apparatus according to (18), including:
a first substrate on which the first region and the second region are layered; and
a second substrate having the third region,
wherein the first substrate and the second substrate transmit and receive the current amplified by the plurality of current amplifications through mutually different ones of the signal transmission units, for each of the pixels.

(20) The image capturing apparatus according to (1), wherein the plurality of photoelectric conversion units, the plurality of current amplification units and the plurality of analog-digital converters, and the plurality of storage units are disposed in mutually different ones of the plurality of regions.

(21) The image capturing apparatus according to (18), wherein the first region, the second region, and the third region are layered on a same substrate.

(22) The image capturing apparatus according to any one of (1) to (21),
wherein the photoelectric conversion units have a semiconductor layer formed from silicon or a semiconductor layer formed from a material other than silicon.

(23) The image capturing apparatus according to any one of (1) to (22),
wherein the signal transmission unit transmits and receives the signals through a via, a bump, or a Cu—Cu connection.

(24) An electronic device including:
an image capturing apparatus that outputs a digital signal, obtained through photoelectric conversion, for each of pixels; and
a signal processing unit that performs signal processing on the digital signal, wherein the image capturing apparatus includes:
a plurality of pixels each having a photoelectric conversion unit;
a floating diffusion that outputs a voltage according to a charge obtained from photoelectric conversion by the photoelectric conversion unit in the pixel;
a current amplification unit that amplifies a current according to the voltage of the floating diffusion;
a storage unit that stores a signal according to the current amplified by the current amplification unit;
an analog-digital converter, provided for each of area pixels constituted by two or more of the pixels among the plurality of pixels, that converts the signals stored in two or more of the storage units corresponding to the two or more pixels in the area pixel into digital signals;
a plurality of regions which are layered and in which a plurality of the photoelectric conversion units in the plurality of pixels, a plurality of the analog-digital converters, a plurality of the floating diffusions, a plurality of the current amplification units, and a plurality of the storage units are disposed; and a signal transmission unit that transmits and receives signals between the plurality of regions,
wherein of the plurality of regions, a region in which the plurality of photoelectric conversion units are disposed is provided separate from a region in which the plurality of current amplification units are disposed, and
the region in which the plurality of photoelectric conversion units are disposed in the area pixel and the region in which the plurality of current amplification units are disposed in the area pixel transmit and receive the voltages of the plurality of floating diffusions through corresponding ones of the signal transmission units.

Aspects of the present disclosure are not limited to the aforementioned individual embodiments and include various modifications that those skilled in the art can achieve, and effects of the present disclosure are also not limited to the details described above. In other words, various additions, modifications, and partial deletions can be made without departing from the conceptual ideas and spirit of the present disclosure that can be derived from the details defined in the claims and the equivalents thereof.

REFERENCE SIGNS LIST

1 Image capturing apparatus
10 Pixel array unit
11 Signal line
11a Upper electrode layer
11a Upper electrode
11b Photoelectric conversion layer
11d Insulating layer
11e Lower electrode layer
12 Signal input transistor
16 Selection transistor
17 Current source
19 Storage unit
20 Time code generation unit
23 Storage unit
30 Reference signal generation unit
40 Vertical driving unit
42 Control signal generation unit
43 Power supply unit
50 Horizontal control unit
52 Time code decoding unit
53 Column signal processing unit
54 Clock signal generation unit
58 Current source
61 Current source
71 Wiring layer
72 Color filter
73 On-chip lens
74 Element separation layer
75 Wiring layer
76 Protective layer
90 Current amplification unit
91 Signal transmission unit 91a Cu—Cu connection
91b Via
92 Storage unit
100 Area pixel
110 Photoelectric conversion unit
150 Comparison unit
160 Comparison output processing unit
161 Preamplifier unit
162 Level conversion unit
163 Waveform shaping unit
170 Conversion result holding unit
171 Storage control unit
172 Storage unit
190 AD conversion unit
200 Time code transfer unit
210 Code holding unit

The invention claimed is:

1. An image capturing apparatus comprising:
a plurality of pixels each having a photoelectric conversion unit;
a floating diffusion that outputs a voltage according to a charge obtained from photoelectric conversion by the photoelectric conversion unit in the pixel;
a current amplification unit that amplifies a current according to the voltage of the floating diffusion;
a storage unit that stores a signal according to the current amplified by the current amplification unit;
an analog-digital converter, provided for each of area pixels constituted by two or more of the pixels among the plurality of pixels, that converts the signals stored in two or more of the storage units corresponding to the two or more pixels in the area pixel into digital signals;
a plurality of regions which are layered and in which a plurality of the photoelectric conversion units in the plurality of pixels, a plurality of the analog-digital converters, a plurality of the floating diffusions, a plurality of the current amplification units, and a plurality of the storage units are disposed; and
a signal transmission unit that transmits and receives signals between the plurality of regions,
wherein of the plurality of regions, a region in which the plurality of photoelectric conversion units are disposed is provided separate from a region in which the plurality of current amplification units are disposed, and
the region in which the plurality of photoelectric conversion units are disposed in the area pixel and the region in which the plurality of current amplification units are disposed in the area pixel transmit and receive the voltages of the plurality of floating diffusions through corresponding ones of the signal transmission units.

2. The image capturing apparatus according to claim 1, wherein the plurality of current amplification units, the plurality of storage units, and the plurality of analog-digital converters are disposed in a same region among the plurality of regions.

3. The image capturing apparatus according to claim 2, wherein the plurality of current amplification units, the plurality of storage units, and the plurality of analog-digital converters are disposed in a same layer in the same region.

4. The image capturing apparatus according to claim 3, wherein two or more of the current amplification units and two or more of the storage units belonging to a same area pixel are disposed symmetrically along respective opposing sides of a corresponding one of the analog-digital converters.

5. The image capturing apparatus according to claim 2, wherein the plurality of current amplification units, the plurality of analog-digital converters, and the plurality of storage units are disposed in mutually different layers in the same region.

6. The image capturing apparatus according to claim 5, wherein the plurality of storage units are disposed in a wiring layer in the same region.

7. The image capturing apparatus according to claim 1, comprising:
a first region in which the plurality of photoelectric conversion units are disposed; and
a second region in which the plurality of current amplification units, the plurality of storage units, and the plurality of analog-digital converters are disposed,
wherein the first region and the second region transmit and receive the voltages of the plurality of floating diffusions through mutually different ones of the signal transmission units, for each of the pixels.

8. The image capturing apparatus according to claim 7, comprising:
a first substrate having the first region; and
a second substrate having the second region,
wherein the first substrate and the second substrate transmit and receive the voltages of the floating diffusions through mutually different ones of the signal transmission units, for each of the pixels.

9. The image capturing apparatus according to claim 1, wherein the plurality of photoelectric conversion units, the plurality of current amplification units and the plurality of storage units, and the plurality of analog-digital converters are disposed in mutually different ones of the plurality of regions.

10. The image capturing apparatus according to claim 9, wherein the plurality of regions include:
a first region in which the plurality of photoelectric conversion units are disposed;
a second region in which the plurality of current amplification units and the plurality of storage units are disposed; and
a third region in which the plurality of analog-digital converters are disposed, and
the first region and the second region transmit and receive the voltages of the plurality of floating diffusions through mutually different ones of the signal transmission units, for each of the pixels.

11. The image capturing apparatus according to claim 10, wherein the plurality of current amplification units and the plurality of storage units are disposed in a same layer in the second region.

12. The image capturing apparatus according to claim 10, comprising:
a first substrate on which the first region and the second region are layered; and
a second substrate having the third region,
wherein the first substrate and the second substrate transmit and receive the signals stored in the plurality of storage units through mutually different ones of the signal transmission units, for each of the pixels.

13. The image capturing apparatus according to claim 1, wherein the plurality of photoelectric conversion units, the plurality of current amplification units, the plurality of storage units, and the plurality of analog-digital converters are disposed in mutually different ones of the plurality of regions.

14. The image capturing apparatus according to claim 13, wherein the plurality of regions include:
a first region in which the plurality of photoelectric conversion units are disposed;
a second region in which the plurality of current amplification units are disposed;
a third region in which the plurality of storage units are disposed; and
a fourth region in which the plurality of analog-digital converters are disposed, and
the first region and the second region transmit and receive the voltages of the plurality of floating diffusions through mutually different ones of the signal transmission units, for each of the pixels.

15. The image capturing apparatus according to claim 14, comprising:
a first substrate on which the first region, the second region, and the third region are layered; and
a second substrate having the fourth region,
wherein the first substrate and the second substrate transmit and receive the signals stored in the plurality of storage units through mutually different ones of the signal transmission units, for each of the pixels.

16. The image capturing apparatus according to claim 14, comprising:
a first substrate on which the first region and the second region are layered; and
a second substrate having the third region and the fourth region,
wherein the first substrate and the second substrate transmit and receive the current amplified by the plurality of current amplification units through mutually different ones of the signal transmission units, for each of the pixels.

17. The image capturing apparatus according to claim 1, wherein the plurality of photoelectric conversion units, the plurality of current amplification units, and the plurality of storage units and the plurality of analog-digital converters are disposed in mutually different ones of the plurality of regions.

18. The image capturing apparatus according to claim 17, wherein the plurality of regions include:
a first region in which the plurality of photoelectric conversion units are disposed;
a second region in which the plurality of current amplification units are disposed; and
a third region in which the plurality of storage units and the plurality of analog-digital converters are disposed, and
the first region and the second region transmit and receive the voltages of the plurality of floating diffusions through mutually different ones of the signal transmission units, for each of the pixels.

19. The image capturing apparatus according to claim 18, comprising:
a first substrate on which the first region and the second region are layered; and
a second substrate having the third region,
wherein the first substrate and the second substrate transmit and receive the current amplified by the plurality of current amplifications through mutually different ones of the signal transmission units, for each of the pixels.

20. The image capturing apparatus according to claim 1, wherein the plurality of photoelectric conversion units, the plurality of current amplification units and the plurality of analog-digital converters, and the plurality of storage units are disposed in mutually different ones of the plurality of regions.

21. The image capturing apparatus according to claim 18, wherein the first region, the second region, and the third region are layered on a same substrate.

22. The image capturing apparatus according to claim 1, wherein the photoelectric conversion units have a semiconductor layer formed from silicon or a semiconductor layer formed from a material other than silicon.

23. The image capturing apparatus according to claim 1, wherein the signal transmission unit transmits and receives the signals through a via, a bump, or a Cu—Cu connection.

24. An electronic device comprising:
an image capturing apparatus that outputs a digital signal, obtained through photoelectric conversion, for each of pixels; and
a signal processing unit that performs signal processing on the digital signal,
wherein the image capturing apparatus includes:
a plurality of pixels each having a photoelectric conversion unit;
a floating diffusion that outputs a voltage according to a charge obtained from photoelectric conversion by the photoelectric conversion unit in the pixel;
a current amplification unit that amplifies a current according to the voltage of the floating diffusion;
a storage unit that stores a signal according to the current amplified by the current amplification unit;
an analog-digital converter, provided for each of area pixels constituted by two or more of the pixels among the plurality of pixels, that converts the signals stored in two or more of the storage units corresponding to the two or more pixels in the area pixel into digital signals;
a plurality of regions which are layered and in which a plurality of the photoelectric conversion units in the plurality of pixels, a plurality of the analog-digital converters, a plurality of the floating diffusions, a plurality of the current amplification units, and a plurality of the storage units are disposed; and
a signal transmission unit that transmits and receives signals between the plurality of regions,
wherein of the plurality of regions, a region in which the plurality of photoelectric conversion units are disposed is provided separate from a region in which the plurality of current amplification units are disposed, and
the region in which the plurality of photoelectric conversion units are disposed in the area pixel and the region in which the plurality of current amplification units are disposed in the area pixel transmit and receive the voltages of the plurality of floating diffusions through corresponding ones of the signal transmission units.

* * * * *